(12) United States Patent
Weng

(10) Patent No.: US 11,713,600 B1
(45) Date of Patent: *Aug. 1, 2023

(54) CHILD SAFETY LOCK

(71) Applicant: Ambarella International LP, Santa Clara, CA (US)

(72) Inventor: Ching-Yu Weng, Hsinchu (TW)

(73) Assignee: Ambarella International LP, Santa Clara, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 17/462,532

(22) Filed: Aug. 31, 2021

Related U.S. Application Data

(63) Continuation of application No. 16/587,421, filed on Sep. 30, 2019, now Pat. No. 11,193,312.

(51) Int. Cl.
*E05B 77/26* (2014.01)
*B60R 25/01* (2013.01)
(Continued)

(52) U.S. Cl.
CPC .............. *E05B 77/26* (2013.01); *B60R 25/01* (2013.01); *B60R 25/305* (2013.01); *E05B 77/02* (2013.01); *G06T 7/70* (2017.01); *G06V 20/593* (2022.01); *G06V 20/597* (2022.01); *G06V 40/103* (2022.01); *G06V 40/161* (2022.01); *G06V 40/172* (2022.01); *G06V 40/20* (2022.01);
(Continued)

(58) Field of Classification Search
CPC ......... E05B 77/26; E05B 77/02; B60R 25/01; B60R 25/305; G06T 7/70; G06T 2207/10016; G06T 2207/20081; G06T 2207/20084; G06T 2207/30196; G06T 2207/30268; G06V 20/593; G06V 20/597; G06V 40/103; G06V 40/161; G06V 40/172; G06V 40/20; G06V 40/178
USPC ........................................................... 382/103
See application file for complete search history.

(56) References Cited

U.S. PATENT DOCUMENTS 9,501,915 B1 * 11/2016 Laska ................... G06V 40/172
10,115,029 B1 * 10/2018 Day ....................... G06V 20/59
(Continued)

FOREIGN PATENT DOCUMENTS

CN          107571794 A   *  1/2018
CN          108556782 A   *  9/2018
(Continued)

*Primary Examiner* — Mahendra R Patel
(74) *Attorney, Agent, or Firm* — Christopher P. Maiorana, PC

(57) ABSTRACT

An apparatus including a capture device and a processor. The capture device may be configured to generate a plurality of video frames corresponding to an interior view of a vehicle. The processor may be configured to perform operations on the video frames to detect objects in the video frames, detect an occupant of the vehicle and a seat of the vehicle based on the objects detected in the video frames, determine a status of the occupant based on characteristics of the occupant detected in the video frames and generate a signal in response to a comparison of the status of the occupant to a threshold. The characteristics may be determined by performing the operations on the occupant in the video frames. The signal may be configured to control a door lock. The door lock controlled by the signal may correspond to the seat used by the occupant.

19 Claims, 14 Drawing Sheets

(51) Int. Cl.
  *B60R 25/30* (2013.01)
  *G06T 7/70* (2017.01)
  *E05B 77/02* (2014.01)
  *G06V 20/59* (2022.01)
  *G06V 40/20* (2022.01)
  *G06V 40/10* (2022.01)
  *G06V 40/16* (2022.01)

(52) U.S. Cl.
  CPC ............ *G06T 2207/10016* (2013.01); *G06T 2207/20081* (2013.01); *G06T 2207/20084* (2013.01); *G06T 2207/30196* (2013.01); *G06T 2207/30268* (2013.01); *G06V 40/178* (2022.01)

(56) References Cited

U.S. PATENT DOCUMENTS

| | | | | |
|---|---|---|---|---|
| 10,525,850 | B1* | 1/2020 | Tang | B60R 16/037 |
| 10,589,713 | B2* | 3/2020 | Boran | B60R 22/48 |
| 10,627,817 | B2* | 4/2020 | Zijderveld | G10L 25/48 |
| 10,838,425 | B2* | 11/2020 | Wendel | B60Q 9/00 |
| 10,956,759 | B1* | 3/2021 | Pertsel | G10L 25/48 |
| 2003/0132667 | A1* | 7/2003 | Willats | E05B 81/76 |
| | | | | 70/262 |
| 2005/0093305 | A1* | 5/2005 | Jackson | E05B 81/54 |
| | | | | 292/216 |
| 2005/0131607 | A1* | 6/2005 | Breed | B60N 2/002 |
| | | | | 701/45 |
| 2009/0039658 | A1* | 2/2009 | Spurr | E05B 81/00 |
| | | | | 292/336.3 |
| 2010/0148923 | A1* | 6/2010 | Takizawa | B60R 25/252 |
| | | | | 340/5.82 |
| 2013/0153324 | A1* | 6/2013 | Kissel, Jr. | B62D 21/152 |
| | | | | 180/253 |
| 2016/0249191 | A1* | 8/2016 | Avrahami | H04W 4/12 |
| 2017/0243455 | A1* | 8/2017 | Johnson | E05B 47/0012 |
| 2019/0205655 | A1* | 7/2019 | Matsuoka | G06V 20/52 |
| 2019/0366981 | A1* | 12/2019 | Huang | B60R 25/252 |
| 2020/0062218 | A1* | 2/2020 | Lee | B60R 25/25 |
| 2022/0089003 | A1* | 3/2022 | Ichinose | H04N 7/186 |

FOREIGN PATENT DOCUMENTS

| | | | | | |
|---|---|---|---|---|---|
| CN | 207955478 | U | * | 10/2018 | ......... B60W 30/025 |
| CN | 109117700 | A | * | 1/2019 | ............. G06F 21/32 |
| CN | 109249895 | A | * | 1/2019 | ........ G06K 9/00295 |
| EP | 1355807 | B1 | * | 10/2005 | ....... B60R 21/01534 |
| EP | 3410343 | A1 | * | 12/2018 | ........ G06K 9/00295 |
| GB | 2220976 | A | * | 1/1990 | ............ E05B 77/265 |
| IN | 201741020349 | A | * | 12/2018 | ............ E05B 77/265 |
| JP | 2015209657 | A | * | 11/2015 | ............... B60Q 1/00 |
| JP | 2017019419 | A | * | 1/2017 | |
| WO | WO-2009027565 | A1 | * | 3/2009 | ....... B60R 21/01534 |
| WO | WO-2014172369 | A2 | * | 10/2014 | ............... B60Q 1/00 |
| WO | WO-2018160272 | A1 | * | 9/2018 | ......... B60W 30/025 |

* cited by examiner

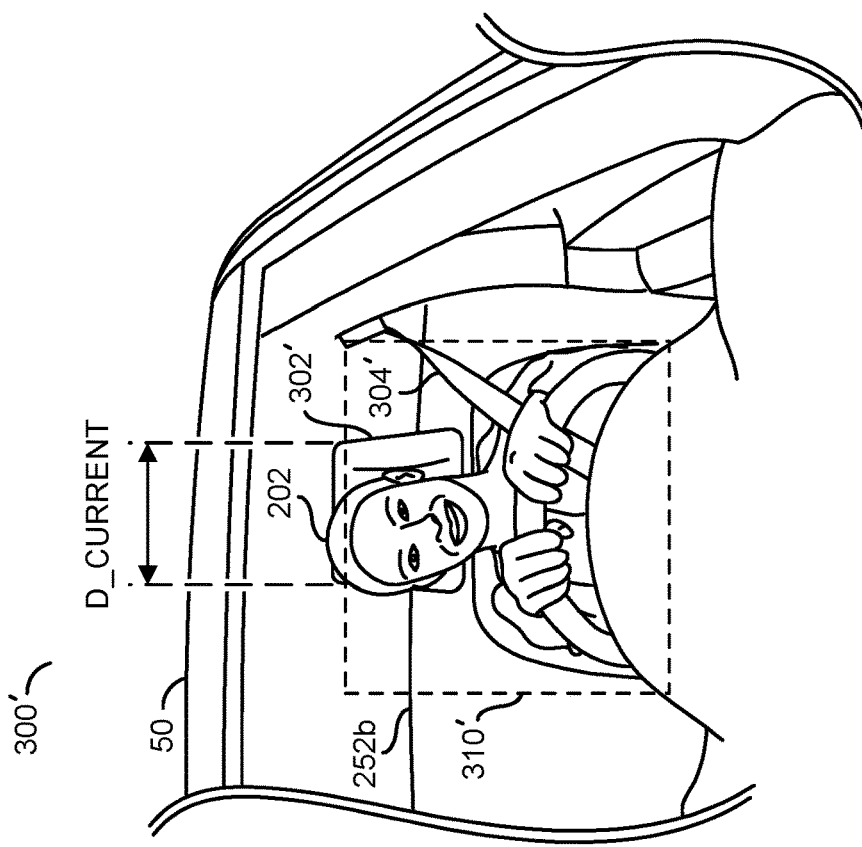
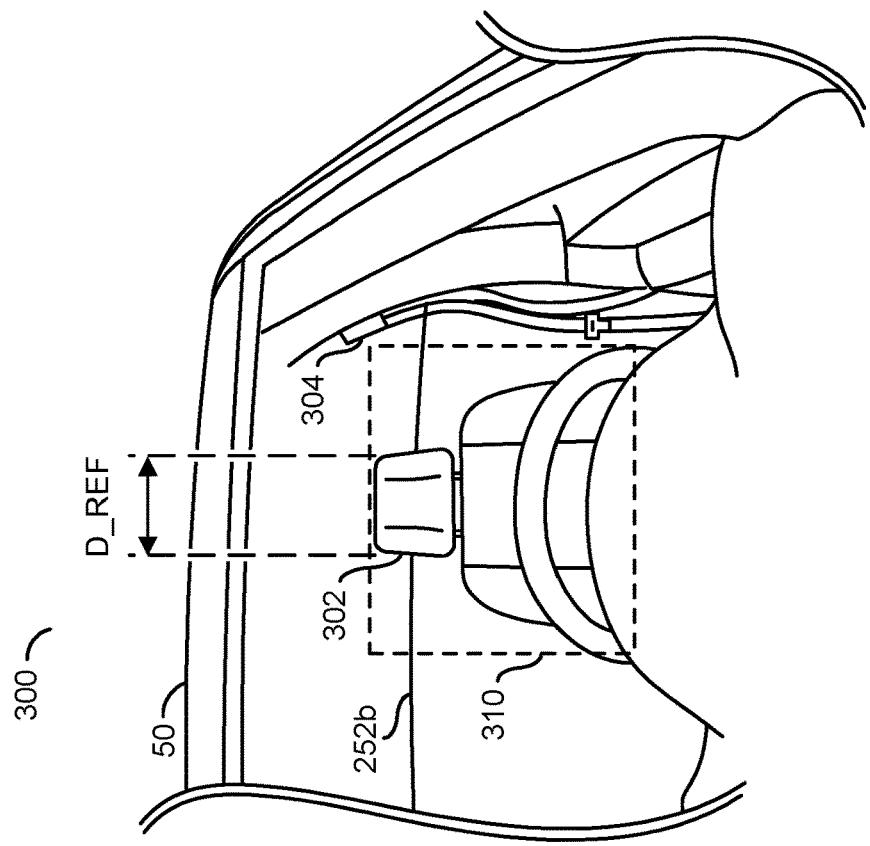
FIG. 4

CHILD SAFETY LOCK

This application relates to U.S. application Ser. No. 16/587,421, filed on Sep. 30, 2019, which is hereby incorporated by reference in its entirety.

FIELD OF THE INVENTION

The invention relates to computer vision generally and, more particularly, to a method and/or apparatus for implementing a child safety lock.

BACKGROUND

Modern vehicles implement child safety locks. Child safety locks are one way to protect a child. The child safety locks prevent accidentally opening the vehicle door (i.e., which could result in a child falling out of a moving vehicle).

However, vehicles are not always occupied by children. Even for vehicle owners that have children, children are not taken every time the vehicle is used. A child safety lock can be a source of annoyance when the car is used by adults. Some adults do not set the child safety lock (i.e., when a person that does not have children drives the children of someone else). For a vehicle user that has passengers of different ages use the vehicle, the child safety lock might not always be set correctly. If the child lock is not set while a child is in the vehicle, there could be a potential danger to the child. If the child lock is set while only adults are in a vehicle, then there may be annoyance and inconvenience.

It would be desirable to implement a child safety lock.

SUMMARY

The invention concerns an apparatus including a capture device and a processor. The capture device may be configured to generate a plurality of video frames corresponding to an interior view of a vehicle. The processor may be configured to perform operations on the video frames to detect objects in the video frames, detect an occupant of the vehicle and a seat of the vehicle based on the objects detected in the video frames, determine a status of the occupant based on characteristics of the occupant detected in the video frames and generate a signal in response to a comparison of the status of the occupant to a threshold. The characteristics may be determined by performing the operations on the occupant in the video frames. The signal may be configured to control a door lock. The door lock controlled by the signal may correspond to the seat used by the occupant.

BRIEF DESCRIPTION OF THE FIGURES

Embodiments of the invention will be apparent from the following detailed description and the appended claims and drawings in which:

FIG. 4 is a diagram illustrating an object comparison between a reference video frame and a captured video frame.

DETAILED DESCRIPTION OF THE EMBODIMENTS

Figure 1:
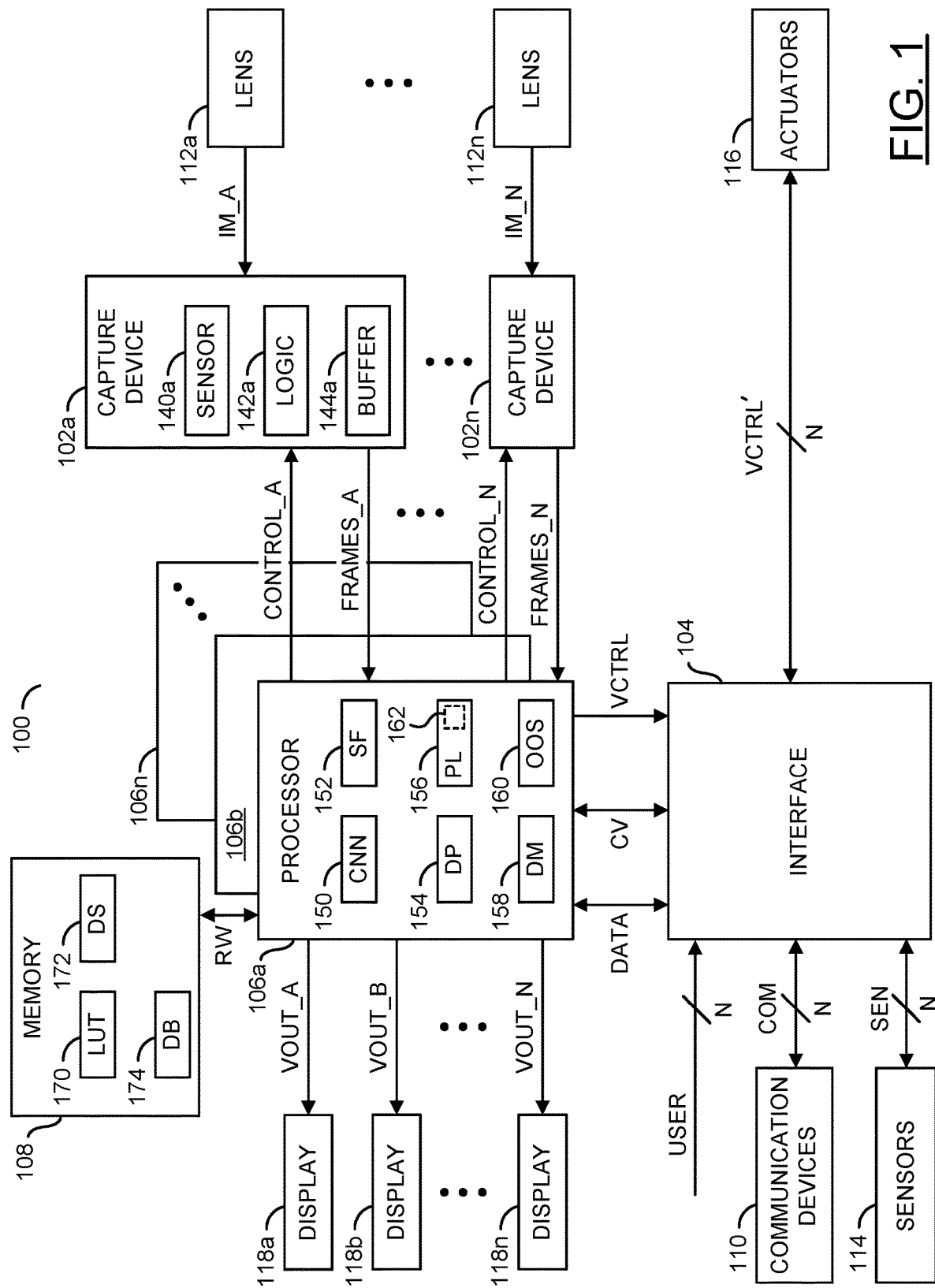
FIG. 1 is a diagram illustrating an embodiment of the present invention.

Embodiments of the present invention include providing a child safety lock that may (i) use computer vision to perform an age estimation, (ii) distinguish between children and adults, (iii) activate a child safety lock when a child is present, (iv) deactivate a child safety lock when a child is not present, (v) control a child safety lock for each door separately based on the presence of a child and/or (vi) be implemented as one or more integrated circuits.

Embodiments of the present invention may be configured to automatically adjust a child safety lock in a vehicle. Automatically adjusting the child safety lock may improve a user experience for vehicle occupants. The user experience may be improved by eliminating an inconvenience caused by a child safety lock for adults (e.g., a user that may not need a child safety lock), while still providing the benefits of a child safety lock for children. A manual adjustment for child safety locks may be inaccessible when the vehicle door is closed, which may prevent adult passengers from disengaging the child lock. Embodiments of the present invention may enable the child safety lock to be automatically engaged/disengaged even when the manual adjustment for the child safety lock is inaccessible.

With the rise in popularity of ride-sharing, adults are commonly entering the vehicles of strangers. If a child safety lock is engaged, a driver of the vehicle could prevent a passenger from escaping the vehicle from a potential attacker. While some vehicles enable a child safety lock to be disengaged from within the vehicle (e.g., manually pressing a button), the button is usually only accessible by the driver, which does not prevent the driver from trapping a passenger in the vehicle. Similarly, embodiments of the invention may detect a hazard (e.g., fire, water filling the interior of the vehicle after a crash, etc.) to prevent an occupant from being locked inside the vehicle. For example, when the child lock is engaged, the interior handle is rendered useless (e.g., moving freely without unlatching the door) resulting in the passenger being unable to open the door nor disable the child safety lock (e.g., the passenger may be locked in). Embodiments of the present invention may implement computer vision to disengage the child safety lock automatically (e.g., without input from the driver). Automatically disengaging the child safety lock for an adult passenger may provide the adult passenger freedom to decide whether or not to open the door.

Embodiments of the present invention may utilize an in-cabin camera (e.g., a camera directed to view passengers in a vehicle) with intelligent vision processing. The intelligent vision processing (e.g., multi-object detection) may enable the age of each passenger to be estimated. The result of the age estimated may be used to generate a signal to a control unit. The control unit may be configured to engage/disengage the child safety lock.

Embodiments of the present invention may be configured to detect for the presence of passengers (e.g., detect for the existence of a passenger in the backseat), locate the face of the passengers detected and/or perform an age estimation on the detected faces. The control unit for the child safety lock may be configured to receive input that indicates the location that the detected passenger is located (e.g., which door the passenger is sitting next to) and whether to engage/disengage the child safety lock (e.g., based on the age of the passenger). Embodiments of the present invention may be configured to operate in various configurations. In one example, one configuration may be that the child safety lock is always engaged. In another example, one configuration may be that the child safety lock is always disengage. In yet another example, one configuration may be that the child safety lock is disengaged by default and then engaged (e.g., locked) based on the age estimation (e.g., lock if a child-aged passenger is detected). In still another example, one configuration may be that the child safety lock is engaged by default and then disengaged (e.g., unlocked) based on the age estimation (e.g., unlock if an adult-aged passenger is detected).

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116 and/or blocks (or circuits) 118a-118n. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be components separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to receive a respective one of the signals IM_A-IM_N, a respective signal (e.g., CONTROL_A-CONTROL_N) and/or present a respective signal (e.g., FRAMES_A-FRAMES_N).

The capture devices 102a-102n may each be configured to generate images and/or video frames in response to the signals IM_A-IM_N (e.g., perform an analog to digital conversion). The capture devices 102a-102n may capture data received through the lenses 112a-112n to generate video image data (e.g., generate video frames). The signals FRAMES_A-FRAMES_N may comprise video frames and/or images generated by the capture devices 102a-102n (e.g., video data). In some embodiments, the capture devices 102a-102n may be configured to perform depth sensing (e.g., the signals FRAMES_A-FRAMES_N may comprise depth information and/or vector light data in addition to the video frames). In one example, the capture devices 102a-102n may perform depth sensing using stereo cameras (e.g., cameras configured as a stereo pair to capture a depth map). In another example, the capture devices 102a-102n may perform depth sensing using time-of-flight. In yet another example, the capture devices 102a-102n may perform depth sensing using structured light. The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The interface 104 may comprise a data bus, traces, connectors, wires and/or pins. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement database storage (e.g., image feature sets, vehicle status, view options, GNSS/GPS positions, a schedule of a user, driver behavior, expected travel times/routes, user preferences, etc.). The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. In some embodiments, the memory 108 may be implemented as part of a black box recorder implemented to survive collisions (e.g., to preserve data to assist in an investigation). The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a LIDAR device, an array of LIDAR devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, engage/disengage locks, etc. The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's-eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The logic 142a may transform the bitstream into a human-legible content (e.g., video data and/or video frames). For example, the logic 142a may receive pure (e.g., raw) data from the camera sensor 140a and generate video data based on the raw data (e.g., the bitstream). The logic 142a may further control the lens 112a in response to the signal CONTROL_A. The memory buffer 144a may store the raw data and/or the processed bitstream. For example, the frame memory and/or buffer 144a may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., day time and night time).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. Details of the computer vision operations implemented by the CNN module 150 may be described in association with FIG. 5.

The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of object to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114, capture devices 102a-102n and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, LIDAR, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by LIDAR for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing (e.g., electronic image stabilization (EIS)), downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps, 4K AVC encoding and/or other types of encoding (e.g., VP8, VP9, AV1, etc.). The video data generated by the video pipeline module 156 may be compressed (e.g., using a lossless compression and/or a low amount of lossiness). The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signal VOUT_A-VOUT_N).

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results.

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118a as the signal VOUT_A. In another example, the decision making module 158 may determine which of the displays 118a-118n to use to display a notification (e.g., an advertisement) and/or where on the video data to place the notification. In yet another example, the decision making module 158 may adjust output characteristics of the displays 118a-118n (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162. The circuit 162 may implement a computer vision pipeline portion. The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real-time. The computer vision pipeline portion 162 may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may be comprise information about particular conditions associated with selecting particular camera views for display. The type of data stored about each driver and/or vehicle occupant in the database storage 174 may be varied according to the design criteria of a particular implementation.

The database storage 174 may comprise information about detected events. The decision module 158 may determine whether an event has occurred based on information from the CNN module 150 and/or the sensor fusion module 152. An event may be a scenario determined by the decision module 158 to be worth storing information about (e.g., a collision, an unknown object detected, a near miss, etc.). The database storage 174 may store metadata corresponding to the detected event. The metadata may comprise a location, a time-of-day timestamp, detected weather conditions, speed of the vehicles, acceleration of the vehicles, etc.). In some embodiments, the metadata may comprise a log of all the measurements of the sensors 114.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, downscaled, packetized, blended, stitched and/or rolling shutter effect corrected versions of the signals FRAMES_A-FRAMES_N. The enhanced versions of the signals FRAMES_A-FRAMES_N may improve upon the view captured by the lenses 112a-112n (e.g., provide night vision, provide High Dynamic Range (HDR) imaging, provide more viewing area, highlight detected objects, provide additional information such as numerical distances to detected objects, provide bounding boxes for detected objects, etc.).

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

Figure 2:
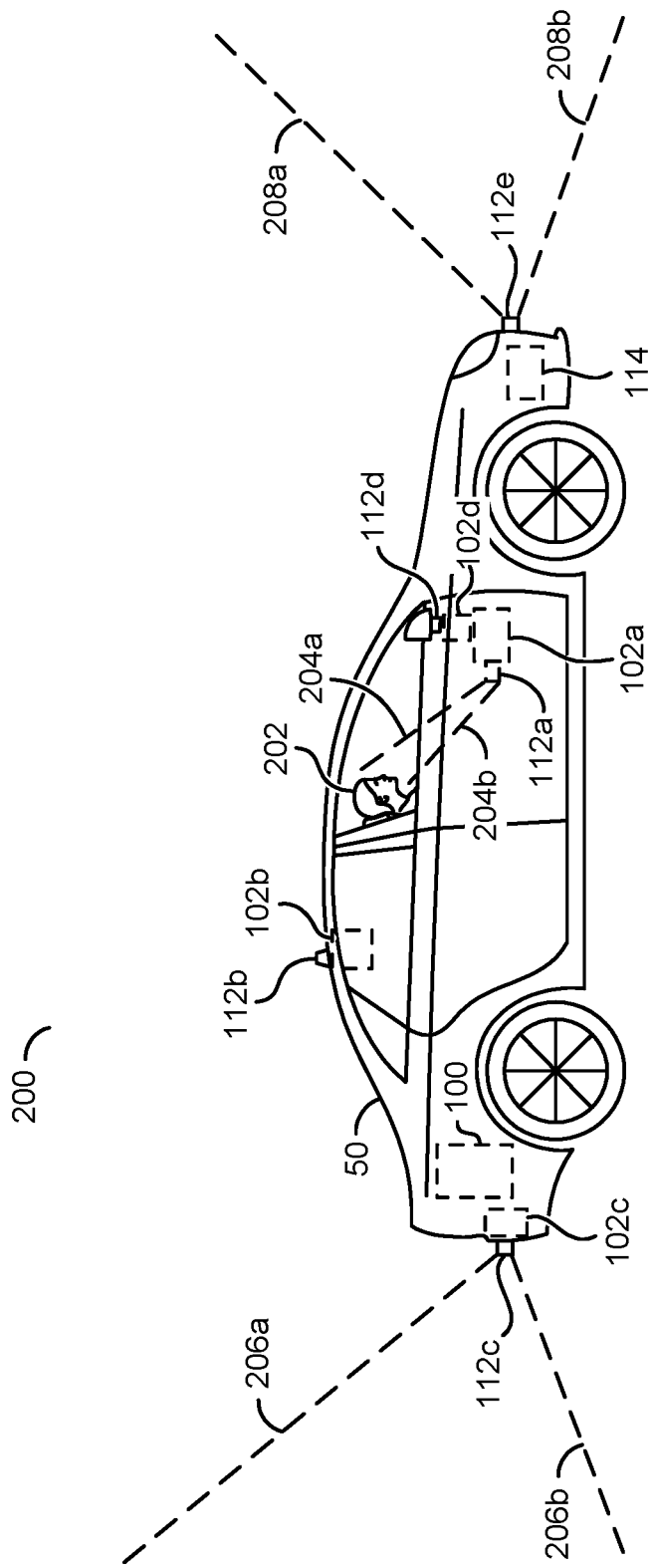
FIG. 2 is a diagram illustrating an example of camera systems inside and outside of a vehicle.

Referring to FIG. 2, a diagram illustrating an example embodiment 200 of camera systems inside and outside of a vehicle is shown. An automobile/vehicle 50 is shown. The apparatus 100 is shown as a component of the vehicle 50 (e.g., an ego vehicle). In the example shown, the ego vehicle 50 is a car. In some embodiments, the ego vehicle 50 may be a truck, an ATV, an airplane, a drone, etc. The type of the ego vehicle 50 implementing the apparatus 100 may be varied according to the design criteria of a particular implementation.

A driver 202 is shown seated in the ego vehicle 50. The vehicle sensors 114 are shown on (or in) the ego vehicle 50. The apparatus 100 is shown in the rear of the ego vehicle 50. In another example, the apparatus 100 may be distributed throughout the ego vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the ego vehicle 50 (e.g., detecting the driver 202). A targeted view of the driver 202 (e.g., represented by a line 204a and a line 204b) is shown being captured by the capture device 102a. The capture device 102a may also detect other objects in the ego vehicle 50 (e.g., a seat, a head rest, an arm rest, a rear window, a seatbelt, a center console, other occupants, etc.). By analyzing video of the driver 202 and/or other occupants of the ego vehicle 50 (e.g., extracting video data from the captured video), the processors 106a-106n may determine a body position and/or body characteristics (e.g., a distance, orientation and/or location of the body and/or head) of one or more occupants of the ego vehicle 50 and/or objects within the ego vehicle 50.

In some embodiments, more than one of the capture devices 102a-102n may be used to capture video data of the driver 202 and/or other occupants of the ego vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112c and the capture device 102c) is shown capturing a targeted view from the ego vehicle 50. In the example shown, the targeted view from the ego vehicle 50 (e.g., represented by a line 206a and a line 206b) is shown capturing an exterior view to the rear of (e.g., an area behind) the ego vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b) may provide a front exterior view of an area. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the ego vehicle 50. The processors 106a-106n may implement computer vision to detect objects and/or understand what is happening near the ego vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a LIDAR device, an array of LIDAR devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the ego vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the ego vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

Figure 3:
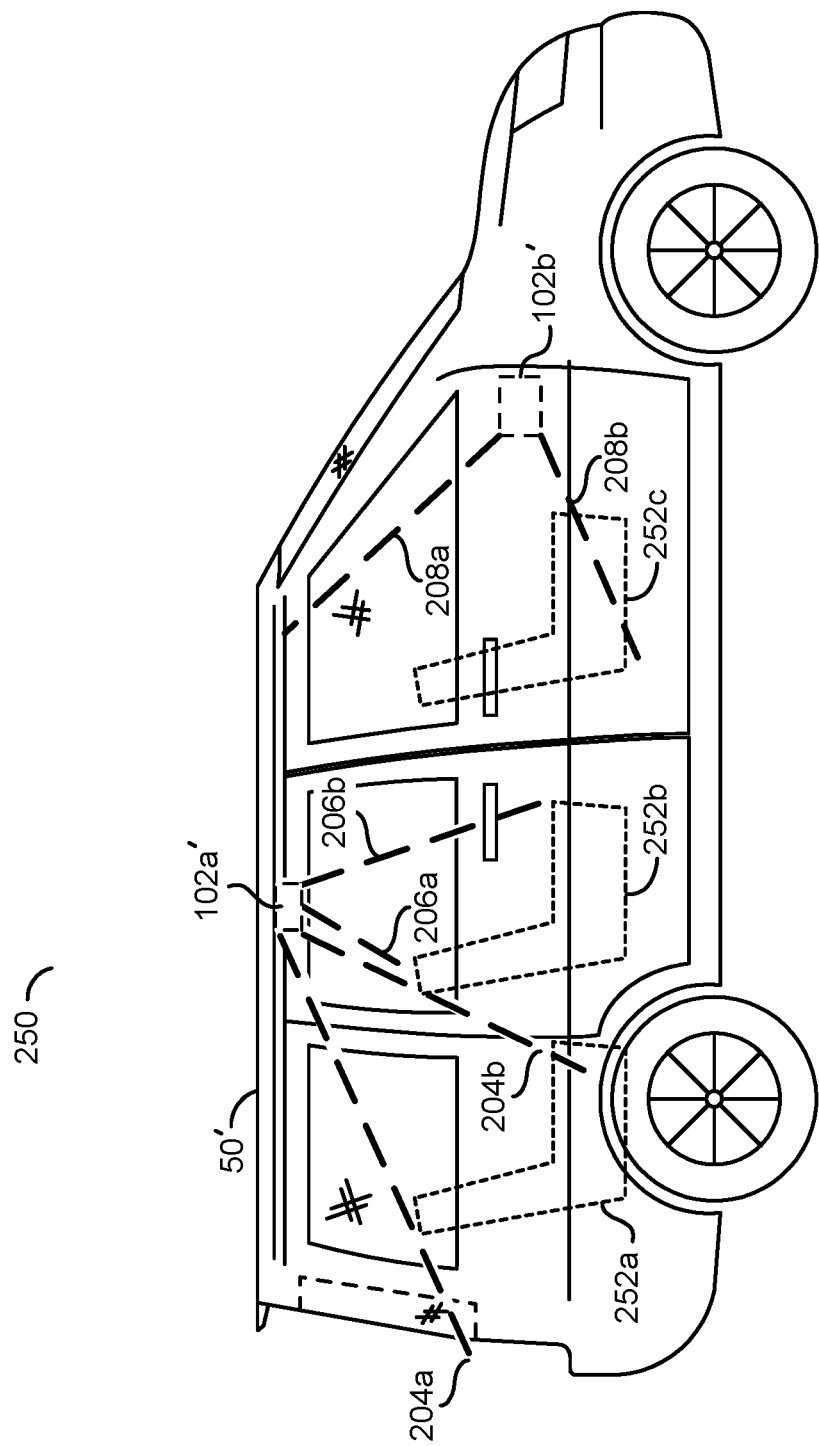
FIG. 3 is a diagram illustrating an example of interior camera systems configured to monitor vehicle occupants.

Referring to FIG. 3, a diagram illustrating an example 250 of interior camera systems configured to monitor vehicle occupants is shown. Various camera angles of an interior of the ego vehicle 50' are shown. Multiple rows of seats 252*a*-252*c* are shown in the ego vehicle 50'. Each of the rows of seats 252*a*-252*c* may be monitored to detect and/or classify one or more occupants of the ego vehicle 50'. The apparatus 100 may be configured to adjust a position of one or more seats in the rows of seats 252*a*-252*c*.

The capture device 102*a*' is shown mounted on a ceiling of the vehicle 50'. The capture device 102*a*' is shown having an angle 204*a* and an angle 204*b* (e.g., a field of view) that points toward the back row of seats 252*a*. The capture device 102*a*' may also have a field of view angle 206*a*-206*b* to capture the middle row of seats 252*b*. In another example, the capture device 102*a*' may implement a wide angle lens to capture both rows of seats. The field of view from the angle 204*a* and the angle 204*b* may provide a targeted view of the interior of the vehicle 50'. Similarly, the capture device 102*b*' may capture an interior of the vehicle 50'. An angle 208*a* and an angle 208*b* may represent a field of view capturing the front row of seats 252*c*. The multiple fields of view captured by the capture devices 102*a*'-102*n*' may be a targeted wide angle view of the interior of the vehicle 50'. The number of angles and/or fields of view may be varied according to the design criteria of a particular implementation.

The processors 106*a*-106*n* may be configured to analyze the captured video signal. The processors 106*a*-106*n* may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106*a*-106*n* may be configured to determine a presence, an absolute location and/or a relative location of the detected objects. Based on the detected objects, the processors 106*a*-106*n* may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106*a*-106*n*. For example, the data received may comprise external signals generated in response to user input, external signals generated by the sensors 114 and/or internally generated signals such as signals generated by the processors 106*a*-106*n* in response to analysis of the video data and/or objects detected in video data.

The processors 106*a*-106*n* may process video data that may not be seen by a person (e.g., not output to the displays 118*a*-118*n*). For example, the video data may be internal to the processors 106*a*-106*n*. Generally, the processors 106*a*-106*n* perform the computer vision operations in order to interpret the environment to emulate how a person would see the environment and/or provide greater sensory capability than a human. For example, the processors 106*a*-106*n* may interpret the environment in many directions at once (e.g., a 360 degree field of view) while a person has a limited field of view.

The video analytics performed by the processors 106*a*-106*n* may be performed on more than one video frame. For example, the processors 106*a*-106*n* may analyze a series (or sequence) of video frames. In some embodiment, the processors 106*a*-106*n* may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious) and/or determine an expected path of a detected object (e.g., determine speed, acceleration and direction to determine a trajectory). The expected path may be further determined based on context such the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106*a*-106*n* may implement depth-sensing techniques. The depth-sensing techniques may compare knowledge of the dimensions of the ego vehicle 50' to the location and/or body position of the occupants. The processors 106*a*-106*n* may cross-reference a body position of the occupants with a location of the components of the vehicle (e.g., how far away the driver is from the steering wheel).

In some embodiments, the video analytics may process the captured video frames for biometric markers to determine a vulnerability of the occupants of the ego vehicle 50'. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106*a*-106*n* may be configured to detect faces in a region of a video frame. In some embodiments, facial recognition may be implemented (e.g., based on faces stored as references in the memory 108 and/or an external database accessible by the communication devices 110). In some embodiments, the processors 106*a*-106*n* may be configured to detect objects and classify the objects as a particular type of object (e.g., an elderly person, a child, an animal, etc.).

The processors 106*a*-106*n* may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106*a*-106*n* may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations may be performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the user of the sensors 114 (e.g., radar, occupancy sensors, temperature sensors, location/orientation sensors, etc.). The type of capture devices implemented may be varied according to the design criteria of a particular implementation.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the ego vehicle 50' was parked, when the ego vehicle 50' came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the ego vehicle 50'. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the ego vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the ego vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may not be directly compared to the reference video frame. For example, the CNN module 150 may implement deep learning to gather information and/or statistics about various features of objects. The CNN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the CNN module 150. The types of features extracted from video frames to perform the computer vision analysis may be varied according to the design criteria of a particular implementation.

Referring to FIG. 4, a diagram illustrating an object comparison between a reference video frame and a captured video frame is shown. The reference video frame 300 and the current video frame 300' may be video frames processed by the processors 106a-106n (e.g., generated in response to the signals FRAMES_A-FRAMES_N by one of the capture devices 102a-102n). The reference video frame 300 and the current video frame 300' may be a targeted view directed towards the interior of the vehicle 50. In an example, the lens 112a mounted on the dashboard of the vehicle 50 may capture the reference video frame 300 and the current video frame 300'. The view captured for each of the video frames may be varied according to the design criteria of a particular implementation.

The reference video frame 300 may be a video frame captured at an earlier time than the current video frame 300'. For example, the reference video frame 300 may be stored in the memory 108 (e.g., in the data storage portion 172). In some embodiments, the reference video frame 300 may be pre-loaded in the apparatus 100. For example, the reference video frame 300 may be captured by implementing fleet learning (e.g., to be described in more detail in association with FIG. 5). In some embodiments, the reference video frame 300 may be captured when the vehicle 50 is idle and/or turned off. In some embodiments, the reference video frame 300 may be captured periodically. The method of capturing the reference video frame (or frames) 300 may be varied according to the design criteria of a particular implementation.

The reference video frame 300 shown may be a representative example of one or more reference video frames implemented by the apparatus 100. In an example, reference video frames 300 may be captured for many different scenarios and/or locations within or outside of the vehicle 50. For example, the reference video frames 300 may be captured for a driver seat, a passenger seat, for each seat of the rows 252a-252c, the interior of the vehicle 50, the exterior of the vehicle 50, etc. Generally, the reference video frame 300 is used by the processors 106a-106n to classify, analyze and/or store reference objects. The reference objects may be used by the processors 106a-106n to compare with objects captured in the current video frame 300'. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. The types of reference objects and/or characteristics of the reference objects may be varied according to the design criteria of a particular implementation.

In the example reference video frame 300, a reference object 302 is shown. In the example shown, the reference object 302 may be a head rest of the driver side seat. The CNN module 150 may determine the width (e.g., D_REF) of the reference object 302 (e.g., based on the number of pixels occupied in the reference video frame 300). In some embodiments, the look up table 170 may store the width D_REF. The width D_REF may be determined when the reference object 302 is at a known distance from the lens 112a.

In the example reference video frame 300, a reference object 304 is shown. In the example shown, the reference object 304 may be a driver seat belt. The CNN module 150 may determine a location of the seat belt 304 (e.g., a location based on a horizontal and/or vertical pixel count). In some embodiments, sensors 114 may provide an indication of the status of the seat belt 304 (e.g., clicked into place, unused, etc.). The sensor fusion module 152 may use the computer vision data from the CNN module 150 and/or the readings of the sensors 114 to determine a confidence level of the status of the seat belt 304. In the example shown, the reference video frame 300 may provide a reference for when the status of the seat belt 304 is unused (e.g., not being worn by a passenger/driver).

In the example reference video frame 300, a reference object 310 is shown. In the example shown, the reference object 310 may be an unoccupied seat. For example, the CNN module 150 may recognize color, shape, distance, stitching, design, etc. of the reference object 310.

The current video frame 300' may be one or more video frames analyzed by the processors 106a-106n (e.g., a video frame within the video pipeline 156). The current video frame 300' may be analyzed by the processors 106a-106n in real-time (e.g., within approximately 500 ms). The CNN module 106a-106n may perform a computer vision analysis on the current video frame 300' and/or compare features and/or characteristics of the current video frame 300' to one or more reference video frames.

The current video frame 300' shows the vehicle 50, the driver 202, the detected object 302', the detected object 304' and/or the detected object 310'. In the current video frame 300', the head rest 302' may be closer to the lens 112a than in the reference video frame 300. In the current video frame 300', the status of the seat belt 304' may be determined to be worn by the driver 202 (e.g., detected across the chest of the driver 202). In the current video frame 300', the detected object 310' may be the driver 202 sitting in the driver seat (e.g., an object covering the details of the empty seat 310 in the reference video frame 300). The processors 106a-106n may detect and/or determine characteristics of various sub-objects of the detected object 310'. In an example, the processors 106a-106n may identify sub-objects such as the eyes of the driver 202, locations of the arms and hands (e.g., holding the steering wheel), location of the hands on the steering wheel (e.g., at the ten and two position of the steering wheel) an angle of the head, a rotation of the head, field of view of the driver (e.g., direction of the eyes), body rotation, body lean, body orientation, a color of clothing, etc.

In some embodiments, one or more of the reference objects (e.g., the head rest 302) may be physically connected to the vehicle 50. In an example, the reference objects may be an arm rest, a steering wheel, the rear seat row 252n, a dashboard, a sunroof and/or a moon roof. The reference object 302 may be a vehicle component that is capable of relative movement with respect to the lens 112a. In some embodiments, the reference object (e.g., the head rest 302) may be used to determine a distance of the driver 202 from the lens 112a (e.g., objects that correlate to where the driver 202 is seated).

For example, if the headrest 302' is determined to be 4.5 feet away (e.g., by comparing the current size D_CURRENT to the reference size D_REF to infer a distance) from the lens 112a then an average sitting posture and head size may be used to estimate that the eyes of the driver 202 may be 3.5 feet from the lens 112a. In another example, the capture device 102a may implement depth-sensing technology to determine how far away the driver 202 is from the lens 112a. In yet another example, stereo video processing may be implemented by the processors 106a-106n to generate a depth map to determine how far away the driver 202 is from the lens 112a. Using the depth information and/or a horizontal and vertical position of the detected object 310', the processors 106a-106n may determine the position (e.g., 3D coordinates and/or location coordinates) of the driver 202 and/or particular body parts of the driver 202.

In some embodiments, the processors 106a-106n may compare the current video frame 300' to the reference video frame 300. In some embodiments, the current video frame 300' may not be directly compared to the reference video frame 300. For example, the CNN module 150 may implement deep learning to gather information and/or statistics about various features of objects. The CNN module 150 may determine features of objects corresponding to the current video frame 300'. The processors 106a-106n may compare the features extracted from the current video frame 300' to features extracted from numerous reference video frames. For example, the reference video frame 300 and/or the current video frame 300' may be used as training data for the CNN module 150. The types of features extracted from video frames to perform the computer vision analysis may be varied according to the design criteria of a particular implementation.

Figure 5:
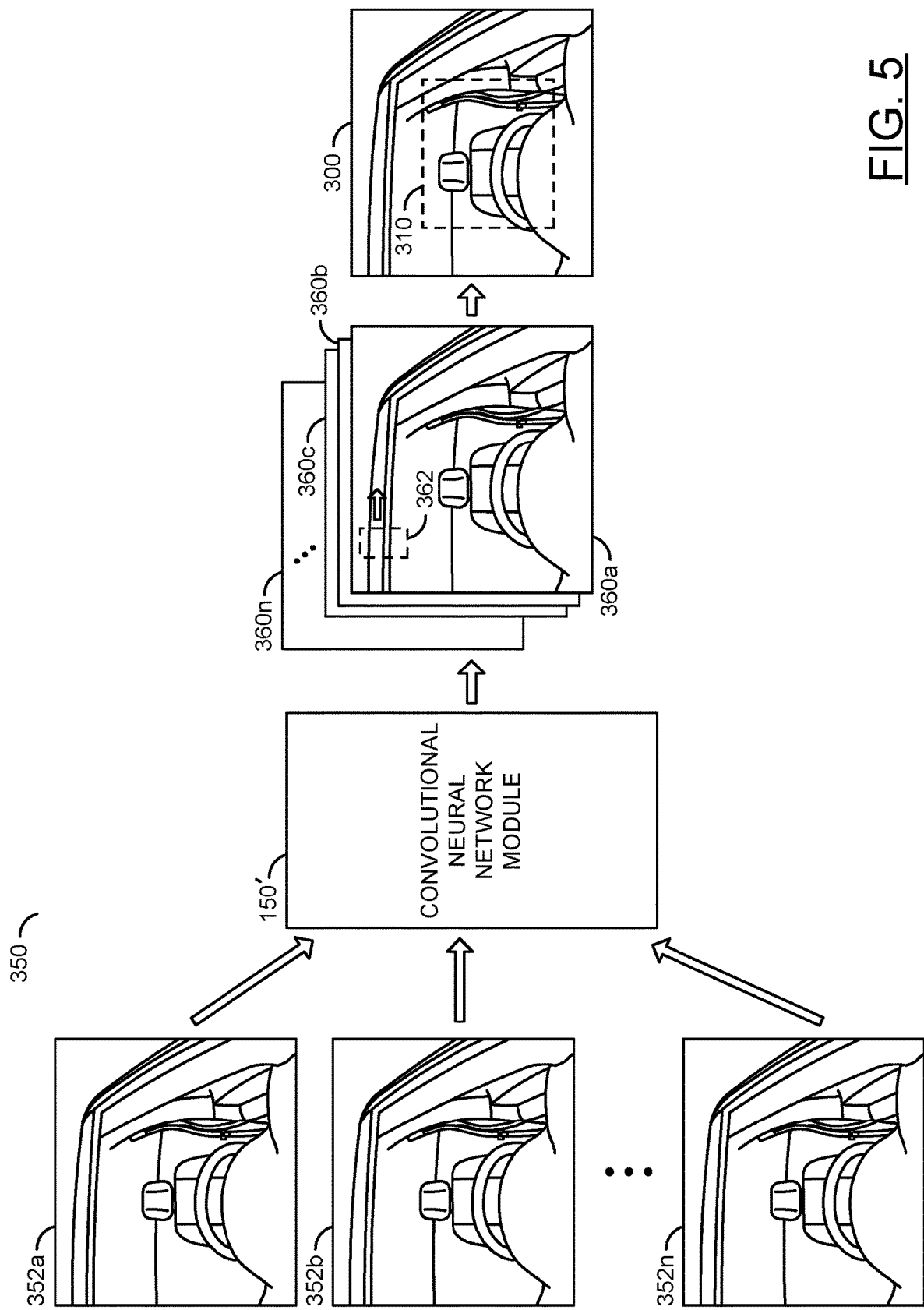
FIG. 5 is a diagram illustrating an example visualization of training a convolutional neural network for object detection using fleet learning.

Referring to FIG. 5, a diagram illustrating an example visualization 350 of training a convolutional neural network for object detection using fleet learning is shown. To detect objects using computer vision, the convolutional neural network 150' may be trained using training data 352a-352n. The training data 352a-352n may comprise a large amount of information (e.g., input video frames). The information for the training data 352a-352n may be received using the video data (e.g., the signals FRAMES_A-FRAMES_N) processed by the video pipeline module 156.

While the apparatus 100 is in operation, the CNN module 150 may continually learn using new video frames as the input training data 352a-352n. However, the processors 106a-106n may be pre-trained (e.g., configured to perform computer vision before being installed in the vehicle 50). For example, the results of training data 352a-352n may be pre-programmed and/or loaded into the processors 106a-106n. In some embodiments, the signal CV generated by the processors 106a-106n may be sent to the interface 104 to enable the communication devices 110 to upload computer vision information (e.g., to a centralized service and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 352a-352n. For example, cameras may be installed in production facilities (e.g., at the end of the production line) to capture many reference images of different types of vehicles to be used as the training data 352a-352n. In the example shown, the training data 352a-352n may capture an interior of a vehicle. In another example, the training data 352a-352n may be a sequence of video frames of a person talking on a cellular phone while driving. In yet another example, the training data 352a-352n may be various video frames of people of different ages. Using the training data 352a-352n (e.g., video frames captured from many different vehicles as the vehicles are produced), many training data sets may be available to train the CNN module 150'. In an example, different makes and models may be analyzed. In another example, different interior colors may be analyzed. In yet another example, different drivers (e.g., different people) talking while holding various models of smartphones may be analyzed. In some embodiments, the training data 352a-352n may be uploaded to a central CNN module 150' to perform and/or train the computer vision. The results of the training from the central CNN module 150' may be installed on each of the CNN modules 150 of each apparatus 100 (or transmitted while the apparatus 100 is in operation to remotely provide updates via the communication devices 110).

The CNN module 150' may receive the training data 352a-352n. To perform the training and/or the computer vision operations, the CNN module 150' may generate a number of layers 360a-360n. On each one of the layers 360a-360n, the CNN module 150' may apply a feature detection window 362. In an example, the feature detection window 362 is shown on a portion of the layer 360a. A convolution operation may be applied by the CNN module 150' on each of the layers 360a-360n using the feature detection window 362.

The convolution operation may comprise sliding the feature detection window 362 along the layers 360a-360n while performing calculations (e.g., matrix operations). The feature detection window 362 may apply a filter to pixels and/or extract features associated with each layer 360a-360n. The feature detection window 362 may be applied to a pixel and a number of surrounding pixels. In an example, the layers 360a-360n may be represented as a matrix of values representing pixels and/or features of one of the layers 360a-360n and the filter applied by the feature detection window 362 may be represented as a matrix. The convolution operation may apply a matrix multiplication between the region of the current layer covered by the feature detection window 362. The convolution operation may slide the feature detection window 362 along regions of the layers 360a-360n to generate a result representing each region. The size of the region, the type of operations applied by the filters and/or the number of layers 360a-360n may be varied according to the design criteria of a particular implementation.

Using the convolution operations, the CNN module 150' may compute multiple features for pixels of an input image in each extraction step. For example, each of the layers 360a-360n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 362 operates on a pixel and nearby pixels, the results of the operation may have location invariance. The layers 360a-360n may comprise convolution layers, pooling layers, non-linear layers and/or fully connected layers. In an example, the convolution operations may learn to detect edges from raw pixels (e.g., the first layer 360a), then use the feature from the previous layer (e.g., the detected edges) to detect shapes in a next layer (e.g., 360b) and then use the shapes to detect higher-level features (e.g., facial features) in higher layers and the last layer may be a classifier that uses the higher level features.

Using the input video frames as the training data 352a-352n, the CNN module 150' may be trained. The training may comprise determining weight values for each of the layers 360a-360n. For example, weight values may be determined for each of the layers 360a-360n for feature extraction (e.g., a convolutional layer) and/or for classification (e.g., a fully connected layer). The weight values learned by the CNN module 150' may be varied according to the design criteria of a particular implementation.

The CNN module 150' may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150' to extract features from the training data 352a-352n may be varied according to the design criteria of a particular implementation.

The CNN module 150' may consume input images (e.g., the training data 352a-352n) that have multiple color channels (e.g., a luminance channel and two chrominance channels). A color detection process implemented by the video pipeline module 156 may be implemented to output images with color likelihood (or probability) values for a particular color at one or more pixel locations in the input images. For example, shared buffers between the video pipeline module 156 and/or the CNN module 150' may enable information sharing between components of the processors 106a-106n. The color detection process may be used to extract features from the training data 352a-352n.

The color detection and/or feature extraction process is generally operational to determine a color likelihood value that pixels in each pixel location of an input image (e.g., the training data 352a-352n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102a and/or the lens 112a) through an inverse perspective mapping.

The CNN module 150' may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicates a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 362 may be considered by the color detection process on one of the layers 360a-360b. The feature extraction window 362 may consider a pixel of interest. In an example, the pixel of interest may be a current pixel location being color classified. The feature extraction window 362 may generally represent a local context and contrast around the pixel of interest.

The pixels of the training data 352a-352n may each be represented as components in multiple color channels. In some designs, the color channels may include a luminance channel (e.g., A) and two chrominance channels (e.g., B and C). In various embodiments, the channels ABC may be representative of YUV, YCbCr, YPbPr, RGB, sRGB or YIQ color models. Other color models may be implemented to meet the design criteria of a particular application.

In various embodiments, the CNN module 150' may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150' generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150' may generate one or more reference video frames 300. The reference video frame 300 may comprise masks and/or categorized instances of the reference objects 310. The reference objects 310 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases. The computer vision operations performed by the CNN module 150' may determine a size, shape, orientation and/or arrangement of a recognized object.

By analyzing a number of video frames in sequence, the computer vision operations performed by the CNN module 150' may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150'.

Figure 6:
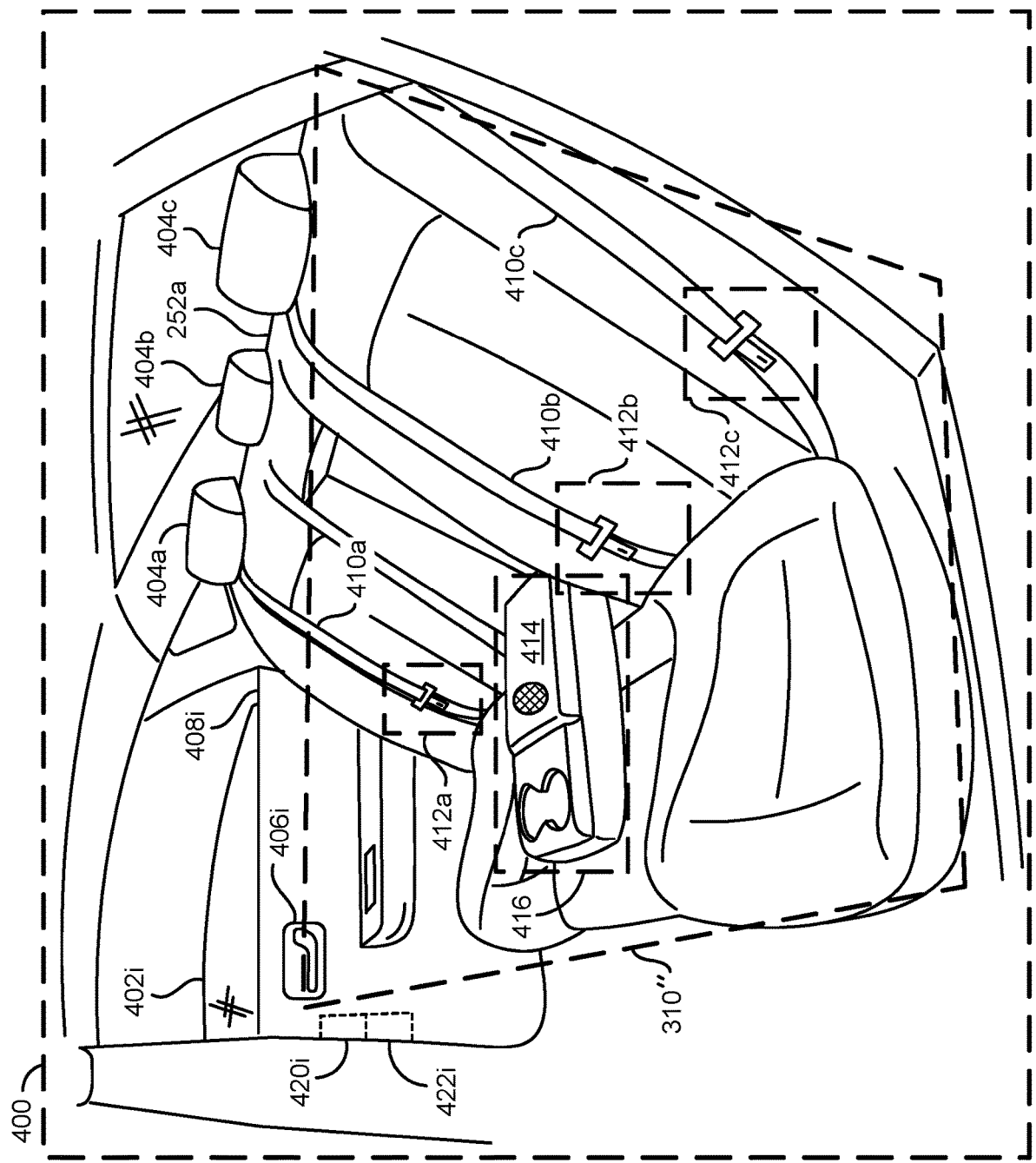
FIG. 6 is a diagram illustrating detecting reference objects corresponding to an empty vehicle seat in a video frame.

Referring to FIG. 6, a diagram illustrating detecting reference objects 310'' corresponding to an empty vehicle seat in a video frame 400 is shown. The video frame 400 may be video data (e.g., one example video frame from a series of video frames in the video data) of the interior of the vehicle 50. The video frame 400 may be an example targeted wide angle view of the interior of the vehicle 50 captured by one of the capture devices 102a-102n. The video frame 400 is shown directed at the back row of seats 252a.

In some embodiments, the video frame 400 may be an example of a reference frame. For example, the reference frame 400 may be used by the apparatus 100 to learn the locations of various reference objects in the vehicle 50. In another example, the video frame 400 may be used as video data for the training data 352a-352n. In yet another example, the video frame 400 may be an example of a current video frame undergoing the computer vision operations (e.g., to detect the presence of a vehicle occupant).

An open window 402i is shown in the video frame 400. In some embodiments, the locations of windows may be used to train the CNN module 150. In some embodiments, the processors 106a-106n may determine characteristics of various objects detected in the video frame 400. In the example shown, the processors 106a-106n may determine that the characteristic of the window 402i is open.

Vehicle seats 404a-404c are shown. The seats 404a-404c may correspond to the back row of seats 252a. A door handle 406i is shown located on the door 408i. The door handle 406i and the door 408i may correspond to the passenger side rear door. Generally, an occupant in the seat 404a may use the door handle 406i to open the door 408i to exit the ego vehicle 50.

The ego vehicle 50 may comprise a number of doors 408a-408n and corresponding door handles 406a-406n (not all visible in the perspective of the example video frame 400). In the example shown, one door is described for illustrative purposes, however a sedan style vehicle may have four doors, a truck may have two doors, a stretch limousine may have more than four doors, etc. Embodiments of the present invention may be similarly applicable to any number of doors.

Seatbelts 410a-410c are shown. The seatbelts 410a-410c may each correspond to one of the seats 404a-404c. Dotted boxes 412a-412c are shown. The dotted boxes 412a-412c may each correspond to one of the seatbelts 410a-410c. The dotted boxes 412a-412c may represent computer vision operations performed on the interior of the ego vehicle 50 recognizing the seatbelts 410a-410c. For example, the CNN module 150 may be configured to detect the seatbelts 410a-410c. The decision module 158 may determine a seatbelt status 412a-412c for each of the seatbelts 410a-410c. In the example shown, the seatbelt status 412a-412c may each be determined to be unbuckled.

An armrest 414 is shown. The armrest 414 may be located at the seat 404b. A dotted box 416 is shown. The dotted box 416 may correspond to the armrest 414. The dotted box 416 may represent computer vision operations performed on the interior of the ego vehicle 50 recognizing the armrest 414. For example, the CNN module 150 may be configured to recognize various objects that may be present within the ego vehicle 50 to detect the armrest 414. The decision module 158 may determine an object status 416. In the example shown, the armrest status 416 may be determined to be in a lowered position.

A dotted box 420i is shown on the door 408i. The dotted box 420i may be a child safety lock. The child safety lock 420i may be a mechanism that may be configured to be engaged or disengaged. When the child safety lock 420i is engaged, the child safety lock 420i may cause the door handle 406i to be non-functional. For example, when the child safety lock 420i is engaged, the door 408i may not be opened from the inside by using the door handle 406i. Engaging the child safety lock 406i may prevent a passenger from opening the door 408i (e.g., prevent opening the door 408i from inside the ego vehicle 50). When the child safety lock 420i is disengaged, the child safety lock 420i may not prevent the functionality of the door handle 406i. For example, when the child safety lock 420i is disengaged, the door 408i may be opened from the inside by using the door handle 406*i*. Disengaging the child safety lock 420*i* may enable a passenger to open the door 408*i* normally.

A block (or circuit) 422*i* is shown. The circuit 422*i* may implement a child lock control unit. The child lock control unit 422*i* may be configured to engage and disengage the child safety lock 420*i* (e.g., in response to a remote command). The apparatus 100 may generate the signal VCTRL' to activate one or more of the actuators 116. The child lock control unit 422*i* may be one of the actuators 116. The signal VCTRL' may be generated to cause the child lock control unit 422*i* to engage or disengage the child safety lock 420*i*. For example, the interface 104 may translate a command to engage the child safety lock 420*i* from the processors 106*a*-106*n* based on the input/output implemented by the child lock control unit 422*i*.

In the example shown, the child lock control unit 422*i* is shown implemented to control a status (e.g., engaged/disengaged) of the child safety lock 420*i*. In some embodiments, one child safety lock 420*a*-420*n* (not all shown) may be implemented for each of the doors 408*a*-408*n* and one child lock control unit 422*a*-422*n* may be implemented to control a respective one of the child safety locks 420*a*-420*n*. In some embodiments, one child lock control unit 422 may be implemented to control each of the child safety locks 420*a*-420*n*. The number of child lock control units 422 implemented and/or the number of child safety locks 420*a*-420*n* controlled by each child lock control unit 422 may be varied according to the design criteria of a particular implementation.

An example detected object 310" is shown. The example detected object 310" may be an unoccupied seat (or seats). In some embodiments, the unoccupied seat 310" may be a reference object used for comparison when a person is in the same seat in another video frame. In some embodiments, when the video frame 400 is a current video frame, the unoccupied seat 310" may represent one or more of the seats of the ego vehicle 50 being detected as unoccupied. In the example shown, each of the seats 404*a*-404*c* may be determined by the processors 106*a*-106*n* to be unoccupied.

The objects detection performed by the CNN module 150 may be used by the decision module 158 to determine whether the seats 404*a*-404*c* are unoccupied. In one example, the seats 404*a*-404*c* may be determined to be unoccupied by the computer vision operations determining that no person is present in any of the seats 404*a*-404*c*. In some embodiments, the sensor fusion module 152 may be configured to provide additional context information to help determine whether the seats 404*a*-404*c* are unoccupied. In one example, the seatbelt status 412*a*-412*c* may be determined to be disconnected. A disconnected seatbelt may provide evidence that the seats 404*a*-404*c* are unoccupied. In another example, the armrest status 416 may be determined to be in the lowered position. Since the lowered position status 416 of the armrest 414 may prevent the seat 404*b* from being occupied, the armrest status 416 may provide evidence that the seat 404*b* is unoccupied. In some embodiments, the sensors 114 may be used to determine the seatbelt status 412*a*-412*c* and/or the armrest status 414 (e.g., a sensor that detects a connected status of the seatbelt). The sensor fusion module 152 may aggregate the information from disparate sources to provide the processors 106*a*-106*n* with data to help determine whether the seats 404*a*-404*c* are occupied or unoccupied.

If the seats 404*a*-404*c* do not have an occupant, then the child lock control unit 422*i* may not adjust a status of the child safety lock 420*i* from a default status. The database 174 may store user preferences. The user preferences may comprise a default operating status for the child safety locks 420*a*-420*n*. In an example, the default operating status may comprise the child safety locks 420*a*-420*n* being always engaged, the child safety locks 420*a*-420*n* being always disengaged, the child safety locks 420*a*-420*n* being disengaged by default and then engaged based on the age estimation or the child safety locks 420*a*-420*n* being engaged by default and then disengaged based on the age estimation. For example, if the child safety lock 420*i* is set to be engaged by default, since there is no occupant detected in the example video frame 400, then the child lock control unit 422*i* may set the child safety lock 420*i* to the engaged status. In another example, if the child safety lock 420*i* is set to be always disengaged, then the child lock control unit 420*i* may be set to disengage the child safety lock 420*i*.

Figure 7:
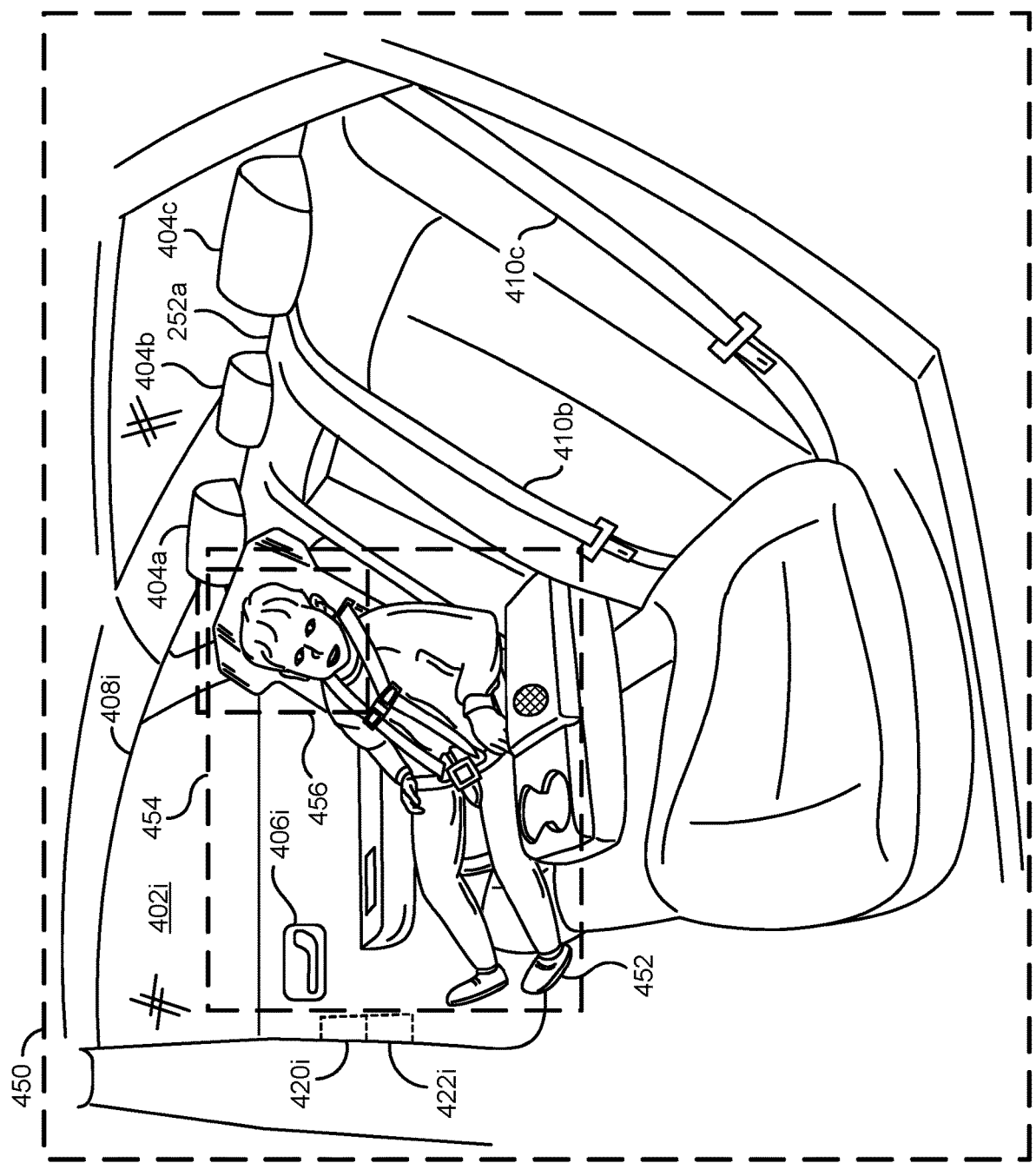
FIG. 7 is a diagram illustrating detecting a child in a video frame.

Referring to FIG. 7 a diagram illustrating detecting an occupant in a video frame 450 is shown. The video frame 450 may be video data (e.g., one example video frame from a series of video frames in the video data) of the interior of the vehicle 50. The video frame 450 may be generated similar to the video frame 400 (e.g., described in association with FIG. 6).

The video frame 450 is shown directed at the back row of seats 252*a*. An occupant 452 is shown in the video frame 450. The processors 106*a*-106*n* may be configured to determine a status of the occupant 452. In the example shown, the occupant 452 may be a small child. The small child 452 may be an example of an occupant with a vulnerable status. A vulnerable occupant may be a type of occupant that may attempt to unlock the door 408*i* while the vehicle is in motion and/or when a caregiver wants the occupant to remain in the ego vehicle 50 (e.g., an occupant for which the child safety lock 420*i* should be engaged). Generally, the status of the occupant may be determined based on an age of the occupant (e.g., children may be considered a vulnerable occupant). In some embodiments, the status of the occupant may be determined based on a mental capacity. For example, an adult that shows indications of dementia and/or being under the influence of drugs/alcohol may be considered an occupant with a vulnerable status. In some embodiments, the status of the occupant may correspond to a class of people (e.g., people under the age of 13). In some embodiments, the status may correspond to a particular person (e.g., a family member that has a particular diagnosis may have a vulnerable status). When the vulnerable occupant is a particular person, the information (e.g., images) of the particular vulnerable occupant may be stored in the database 174. In some embodiments, the actions and/or gestures of an occupant may determine the status of the occupant 452.

Generally, the driving policy module 154 may determine how to interpret the status of the occupant 452. In some embodiments, different product vendors may program the driving policy module 154 with preferences on how to determine the status of the occupant 452. In some embodiments, the driving policy module 154 may be programmed according to local regulations. How the status of the occupant 452 is categorized may be varied according to the design criteria of a particular implementation.

The processors 106*a*-106*n* may utilize the CNN module 150 to identify, detect and/or classify the occupant 452 (e.g., as a small child, in the example shown). The CNN module 150 may implement the computer vision operations to determine the characteristics of the occupant 452 (e.g., age, seat location, actions/gestures, etc.). The processors 106*a*-106*n* may utilize the classification of the occupant 452 and/or the characteristics of the occupant 452 determined using the computer vision operations in conjunction with the driving policy module 154 to determine the vulnerability of the occupant 452.

The vulnerable status determined by the processors 106a-106n may not imply a weakness, frailty and/or importance of the occupants 452. The status of the occupant 452 may comprise a likelihood of harm and/or a need for protection. For example, if the occupant 452 is a child the child might accidentally open the vehicle door 408i while the vehicle 50 is in motion, which could cause serious injury to the child (e.g., the child safety lock 420i may be engaged because the child is vulnerable). In another example, the occupant 452 may be a victim of an attack by a driver and the victim may be attempting to open the door 408i (e.g., the gesture of the occupant 452 may indicate that the occupant is vulnerable to an attack and is attempting to escape so the child safety lock 420i should be disengaged). The response by the processors 106a-106n may be determined by the context of the status.

Generally, each occupant 452 of the vehicle 50 may be detected by the processors 106a-106n. The processors 106a-106n may determine various characteristics of the occupants 452 to determine the status of the occupant. Each occupant 452 may be accorded a status according to the driving policy module 154. In an example, the status may enable the processor 106a-106n to determine how to control the child safety locks 420a-420n.

The CNN module 150 may be configured to classify objects as the occupant 452. The CNN module 150 may further classify the occupant as a particular type and/or class of occupant (e.g., a child, a pet, an adult, an elderly person, a differently-abled person, etc.). The CNN module 150 may further determine characteristics of the occupant 452 based on the characteristics detected. The processor 106a-106n and/or the driving policy module 154 may determine the status of the occupant 452 based on the classification and/or the characteristics detected using the computer vision operations. The types of object classifications may be varied according to the design criteria of a particular implementation.

The video analytics and/or computer vision operations performed by the CNN module 150 may process the video frame 450 and/or other video signals for biometric markers to determine the characteristics of the occupant 452. For example, one or more of age, height and/or weight may be biometric markers used to determine the status of the occupant 452. The biometric markers may be used to differentiate between a child, an adolescent, etc. (e.g., a person that may not understand the consequences of opening the door 408i while the vehicle 50 is moving) and a young adult, teenager, adult, etc. (e.g., a person that may be inconvenienced by the child safety locks 420a-420n).

In some embodiments, the age, height, weight and/or other biometric markers (e.g., characteristics) used to determine the status of the occupant 452 may be similar to attributes used in regulations for sitting in the front seat of a vehicle and/or other vehicle safety regulations. Various biometric markers may be stored as reference data in the look up table 170. For example, the look up table 170 may store different heights, weights, ages, etc. applicable to different regions (e.g., based on different regulations in a particular city/state/province/country). The types of biometric markers used to determine the status of the occupant 452 may be varied according to the design criteria of a particular implementation.

A dotted box 454 is shown. The dotted box 454 may correspond to the occupant 452. The processors 106a-106n may be configured to detect the presence of the occupant 452 (e.g., determine whether the seat 404a is occupied by the occupant 452 or not occupied). The dotted box 454 may represent the computer vision operations detecting the occupant 452 and determining a location of the occupant 452. For example, the processors 106a-106n may be configured to determine that the occupant 452 is present and that the occupant 452 is located in the seat 404a.

A dotted box 456 is shown. The dotted box 456 may correspond to a face of the occupant 452. The processors 106a-106n may be configured to analyze the facial features of the occupant 452. The dotted box 456 may represent the analysis of the facial features of the occupant 452 by the CNN module 150. In an example, the processors 106a-106n may first determine whether the occupant 452 is present in a particular one of the seats 404a-404c and then analyze the facial features 456. The facial features 456 may be used to determine an age of the occupant 452 and/or determine an identity of the occupant 452. For example, the facial features 456 may be compared to the known faces in the database 174 to determine whether the occupant 452 is a known person. The processor 106a-106n may be configured to recognize faces through facial recognition (e.g., based on faces stored as references in the database 174). The status of the occupant 452 may be stored in the database 174 in association with the facial detection information 456 corresponding to the occupant 452.

A high confidence level for a status and/or detection of a particular occupant may indicate that the computer vision result is consistent with the particular type of object (e.g., occupant). A low confidence for a status and/or detection of a particular occupant may indicate that the computer vision result is inconsistent with the particular type of object (e.g., occupant). Various checks may be performed to determine the confidence level. The reaction (e.g., generating the signal VCTRL' for the child lock control unit 422i) may be performed when the confidence level is above a pre-defined threshold. In some embodiments, information from the vehicle sensors 114 (e.g., an amount of weight detected in a particular seat) may be used to adjust the confidence level.

The apparatus 100 may be configured to distinguish between objects interior to the vehicle 50 (e.g., the small child 452) and objects exterior to the vehicle 50 (e.g., a pedestrian outside the window 402i'). For example, depth-sensing techniques may be implemented to determine which of the objects detected in the video frame 450 are inside the vehicle 50. In another example, the video frames from the interior of the vehicle 50 may be compared with video frames of the outside area of the vehicle 50 (e.g., one of the capture devices 102a-102n may capture a similar view outside of the vehicle 50 that may be seen through the window 402i' from the video frame 450 captured by another one of the capture devices 102a-102n) to determine which objects are interior and which objects are exterior to the vehicle 50.

In the example shown, the processors 106a-106n may determine that the detected occupant 454 is located in the seat 404a. The processors 106a-106n may be configured to associate the location of the occupant 452 in the seat 404a with the door 408i (e.g., the door that the occupant 452 is most likely to attempt to open). In some embodiments, the processors 106a-106n may associate the location of the occupant 452 with the row 252a and determine that the door 408i and another door (e.g., the other rear door, not shown) should be associated with the occupant 452 (e.g., the occupant may attempt to open both doors). The processors 106a-106n may perform the facial analysis 456 and/or other video analysis and/or sensor fusion analysis (e.g., weight of the occupant) to determine the status of the occupant 452. In the example shown, the processors 106a-106n may determine that the status of the occupant 452 is a young child. The decision module 158 may determine the response for the particular status (e.g., the look up table 170 may be used to cross-reference the detected status with the appropriate response for the detected status). The appropriate response for the young child may be to engage the child safety lock 420i for the door 408i. The processors 106a-106n may be configured to send a control signal to the child lock control unit 422i that controls the child safety lock 420i. The control signal may provide instructions and/or signals to engage the child safety lock 420i. For example, the processors 106a-106n may generate the signal VCTRL to the interface 104 and the interface 104 may forward the signal VCTRL' to the appropriate child lock control unit 422i to ensure that the child safety lock 420i is engaged.

In some embodiments, the user preferences 174 may be set according to local rules (e.g., laws, regulations, local customs, etc.). The threshold for a particular status may be determined based on the location of the ego vehicle 50. In an example, in a particular location, the age limit for engaging the child safety locks 420a-420n may be 10 years old or younger. If the processors 106a-106n determine that the occupant 452 is 10 years old or younger, then the processors 106a-106n may generate the signal VCTRL for the child lock control unit 422i to cause the child safety lock 420i to be engaged. The types of characteristics governed by the local rules used to determine the threshold may be varied according to the design criteria of a particular implementation.

Figure 8:
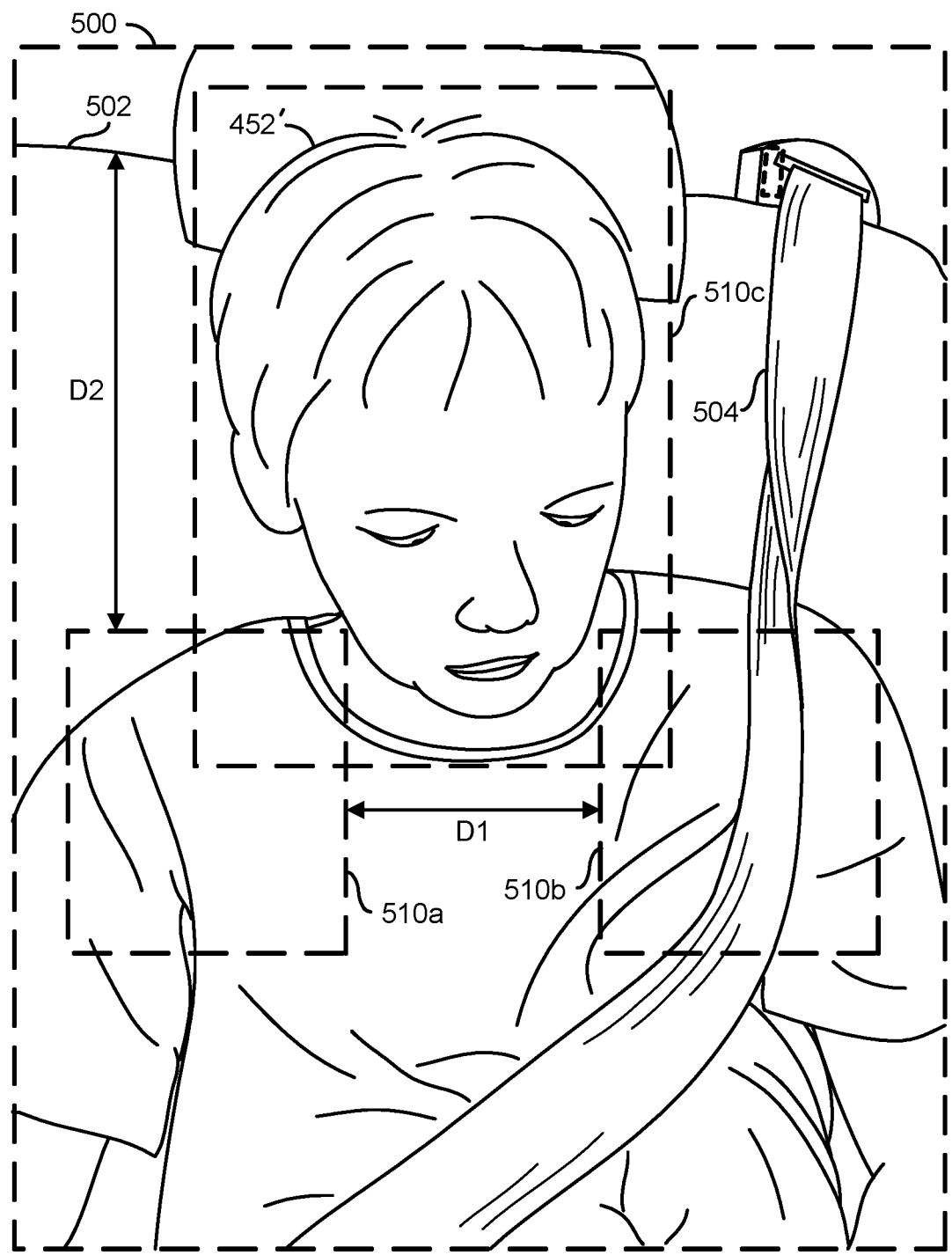
FIG. 8 is a diagram illustrating a processor determining characteristics of an occupant.

Referring to FIG. 8, a diagram illustrating the processors 106a-106n determining characteristics of an occupant is shown. An example video frame 500 is shown. The example video frame 500 may be one of the video frames FRAMES_A-FRAMES_N captured using one of the capture devices 102a-102n directed at a seat 502 of the vehicle 50. The occupant 452' is shown in the seat 502. The seatbelt 504 is shown worn by the occupant 452'. In the example shown, one occupant 452' in one seat 502 is shown being analyzed using the computer vision operations. However, the apparatus 100 may be configured to detect numerous seats (e.g., seats 502a-502n, not shown), seatbelts (e.g., seatbelts 504a-504n, not shown) and/or occupants (e.g., occupants 452a-452n, not shown) for the entire interior of the vehicle 50. While only one occupant, seat and/or seatbelt may be shown for illustrative purposes, aspects of the invention 100 may be similarly applicable and/or performed for each of the seats 502a-502n, seatbelts 504a-504n and/or occupants 452a-452n.

The CNN module 150 may analyze the video frame 500 to determine the characteristics of the occupant 452'. Boxes 510a-510c are shown in the video frame 500 to represent various body parts of the occupant 452' that may be identified using computer vision. In the example shown in FIG. 8, three body parts (e.g., 510a-510c) are shown as identified by the CNN module 150 (e.g., for illustrative purposes). However, the CNN module 150 may identify and/or analyze numerous different body parts (e.g., 510a-510n, not shown). The body parts identified may be varied according to the design criteria of a particular implementation.

The body parts 510a-510n may be used by the processors 106a-106n to determine the characteristics of the occupant 452'. In the example shown, the body parts 510a-510c may be used to determine a size, orientation, position and/or location of the occupant 452' (e.g., relative to the interior of the vehicle 50 and/or relative to the seat 502). In the example shown, the processors 106a-106n may identify the shoulders 510a-510b of the occupant 452' and/or the head of the occupant 452'. In some embodiments, the computer vision operations may analyze individual body parts and/or the body as a whole.

In the example shown, the box 510a may represent a right shoulder of the occupant 452' and the box 510b may represent a left shoulder of the occupant 452'. The shoulders 510a-510b may represent characteristics of the occupant 452' that have been detected by the processors 106a-106n. A distance D1 is shown between the boxes representing the shoulders 510a-510b. The distance D1 may be used to determine the size and/or width of the occupant 452'. The distance D1 may be illustrative and the determination of the distance D1 may be more accurate than measurements to the boxes 510a-510b shown. For example, the processors 106a-106n may be configured to identify the body parts 510a-510b in the video frame 500 and measure a distance between the body parts 510a-510b. In an example, the distance D1 may be used to determine the characteristics of the occupant 452' to provide one potential source of information for determining an age and/or body size of the occupant 452'.

A distance D2 is shown between the shoulder 510a and the top of the seat 502. The distance D2 may be used to determine a size of the occupant 452' relative to the seat 502. The distance D2 may be illustrative and the determination of the distance D2 may be more accurate than measurements to the box 510a shown. In one example, the measurements may be performed at a pixel level. For example, the age and/or body size of the occupant 452' determined by the processors 106a-106n may be based on the location and/or height of the occupant 452' relative to the seat 502. While one measurement (e.g., D2) is shown relative to the seat 502, numerous measurements (e.g., width of the body with respect to the seat 502, a distance from the head 510c to the headrest of the seat 502, a distance from the left shoulder 510b to the top of the seat 502, etc.) may be performed by the processors 106a-106n to determine an approximate age and/or body size of the occupant 452'.

The head 510c of the occupant 452' is shown. The CNN module 150 may determine various characteristics of the head and/or face 510c of the occupant 452' (e.g., facial characteristics). In one example, the size and/or shape of the detected face 510c may be compared to the size and/or shape of other faces (e.g., adults and/or children) by the CNN module 150 to approximate an age of the occupant 452'. In another example, the size and/or shape of the detected face 510c may be compared to the size and/or shape of a known face to determine whether there is an identity match (e.g., based on a confidence level threshold). Distances between and/or sizes of various facial features (e.g., eyes, nose, mouth, cheekbones, jaw, chin, eyebrows, forehead, ears, etc.) may be analyzed by the processors 106a-106n and/or compared with statistical data about facial features of people at particular ages. The analysis and/or comparisons performed by the processors 106a-106n may be used to approximate an age of the occupant 452' based on the computer vision operations. The types of analysis performed, the facial features analyzed, the comparisons made and/or the statistical information used for comparison may be varied according to the design criteria of a particular implementation.

In some embodiments, the overall size of the head 510c may be used to determine the age of the occupant 452'. In an example, the size of the head 510c may be compared to the overall size of the body of the occupant 452'. Generally, for a younger person the relative size of the head in proportion to the overall body size may be larger. For example, an adult may have a smaller head in proportion to the overall body size than a child. The processors 106a-106n may be configured to use the detected size of the head 510c as one factor for determining an approximate age of the occupant 452'.

In some embodiments, the processors 106a-106n may determine the age based on secondary sex characteristics. For example, the detection of visible secondary sex characteristics using the computer vision operations may determine if the occupant 452' has reached puberty to help approximate the age (e.g., over the age of 12). In an example, the visible secondary sex characteristics may comprise detecting facial hair, detecting enlarged breasts, detecting widened hips, detecting an enlarged Adam's apple, etc. In another example, the computer vision operations may detect a baby bump indicating that the occupant 452' is pregnant (e.g., to help approximate the age).

The processors 106a-106n may determine the age of the occupant 452' based on an aggregation of various characteristics detected using the computer vision operations performed by the CNN module 150. Statistical weight may be adjusted for various characteristics. For example, a higher confidence level of an accurate detection of particular characteristic may have more statistical weight than a lower confidence level of accurate detection. In another example, particular characteristics may have a higher statistical weight (e.g., to account for particular factors that may provide a better indication of age such as the size of the head). The various factors and/or the statistical weights applied by the processors 106a-106n for each type of factor used for determining the age of the occupant 452' may be varied according to the design criteria of a particular implementation.

The decision module 158 may select an appropriate selection for the child safety locks 420a-420n in response to the characteristics of the occupant 452' (e.g., the age and/or size of the occupant 452') and/or the location of the seat 502 in the vehicle 50 determined as a result of the computer vision operations. The appropriate selection may correspond to the scenario detected. In an example scenario where an adult is detected, the appropriate selection may be to disengage the child safety locks 420a-420n. In an example scenario where a child is detected, the appropriate selection may be to engage the child safety locks 420a-420n.

In one example, the CNN module 150 may detect the shoulders 510a-510b and/or analyze the features of the face 510c and the processors 106a-106n may calculate the size of the occupant 452' and/or approximate age of the occupant 452'. The processors 106a-106n may also determine a location of the seat 502 with respect to the interior of the vehicle 50. The decision module 158 may select the appropriate reaction based on the location of the seat 502 and/or the characteristics (e.g., age and/or size) of the occupant 452'. For example, each seat location may have a pre-defined threshold criteria (e.g., stored in the memory 108) for age and/or body size of the occupants 452a-452n. One of the child safety locks 420a-420n may be engaged if the occupant in the particular seat does not meet the threshold.

Figure 9:
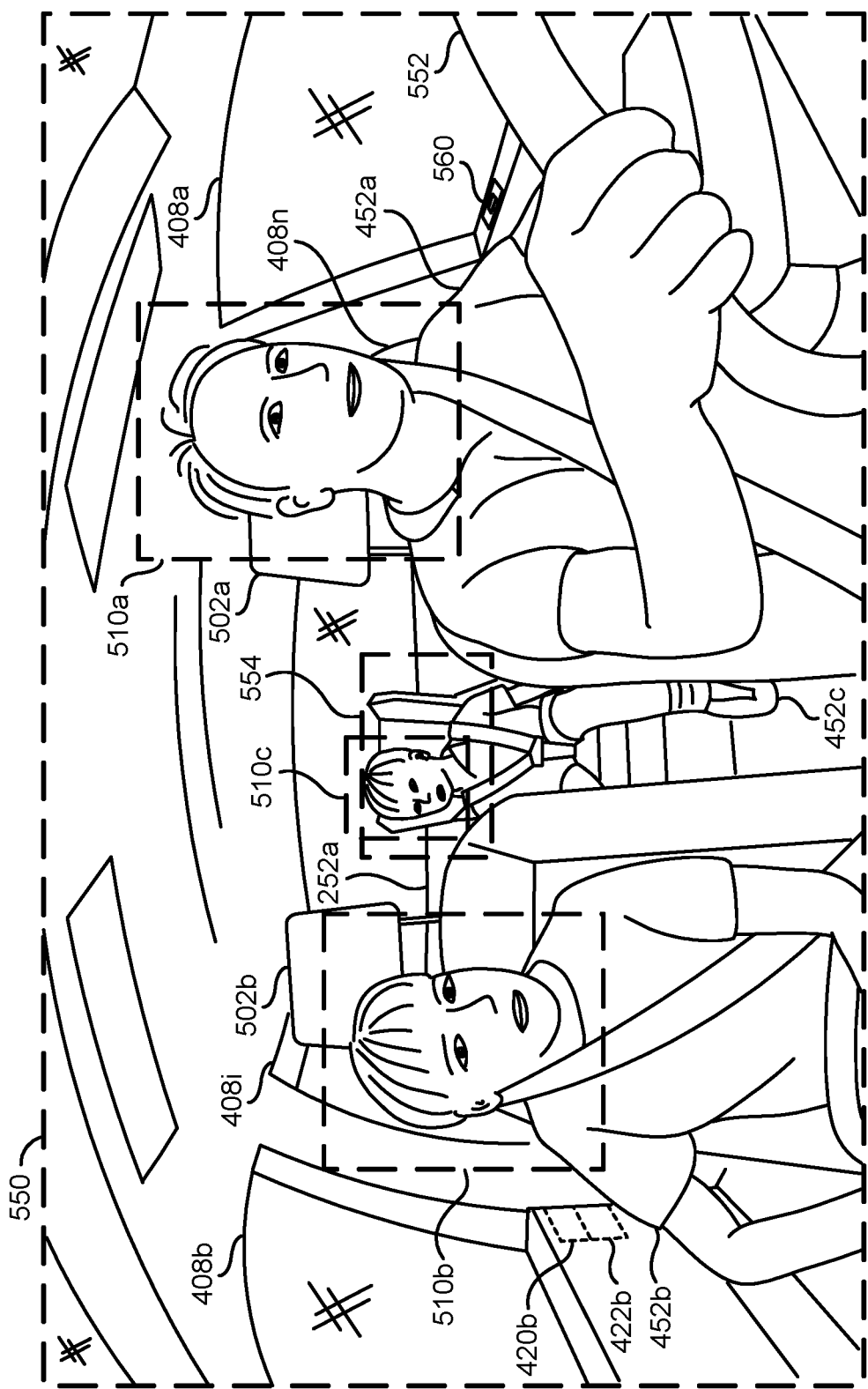
FIG. 9 is a diagram illustrating an example of a processor analyzing characteristics of passengers in a vehicle cabin.

Referring to FIG. 9, a diagram illustrating the processors 106a-106n analyzing characteristics of passengers in a video frame of a vehicle cabin is shown. A video frame 550 is shown. The video frame 550 may be a video frame captured by one or more of the capture devices 102a-102n of the interior of the vehicle 50. In one example, the lens 112a of the capture device 102a may implement a wide angle lens configured to capture a wide angle field of view of the interior of the vehicle 50. For example, the processors 106a-106n may be configured to perform video de-warping operations on potential distortions caused by the wide angle lens 112a before performing the computer vision operations. In another example, the video frame 550 may be created by stitching together video frames captured at the same time by more than one of the capture devices 102a-102n. For example, the processors 106a-106n may be configured to perform video stitching operations to combine multiple video frames together in order to generate the video frame 550 before performing the computer vision operations. Capturing a wide angle view and/or generating a stitched view of the interior of the vehicle 50 may enable the processors 106a-106n to analyze a view showing more than one of the occupants 452a-452n of the vehicle 50. The method of capturing the wide angle video frame 550 may be varied according to the design criteria of a particular implementation.

In the example video frame 550, a number of occupants 452a-452c are shown. For example, the driver 452a is shown in the driver seat 502a, the passenger 452b is shown in the passenger seat 502b and the occupant 452c is shown in a seat in the back row 252a (e.g., a bench seat). The CNN module 150 may be configured to detect various objects in the video frame 550. In an example, the computer vision operations may detect a steering wheel 552 (or other features of the interior of the vehicle 50). In another example, the computer vision operations may detect the driver seat 502a, the passenger seat 502b and/or the back row bench seat 252a.

The boxes 510a-510c are shown. The boxes 510a-510c may be a detected object and/or group of objects representing faces, body parts and/or heads detected by the processors 106a-106n. For example, the face 510a may correspond to the occupant 452a, the face 510b may correspond to the occupant 452b and the face 510c may correspond to the occupant 452c. In the example shown, the objects 510a-510c may be faces of the occupants 452a-452c, however the computer vision operations performed by the processors 106a-106n may analyze and/or characterize any combination of body parts of the occupants 452a-452c to determine the status of the occupants 452a-452c.

A box 554 is shown. The box 554 may correspond to a child safety seat detected by the processors 106a-106n. The processors 106a-106n may be configured to detect the seats 502a-502b and/or the bench seat 252a and/or other objects of the interior of the vehicle 50. The processors 106a-106n may be configured to associate a location of the occupants 452a-452c with the seats 502a-502b and/or the bench seat 252a.

The processors 106a-106n may be configured to determine the age of the occupants 452a-452c based on the faces 510a-510c (e.g., facial features) and/or other characteristics of the occupants 452a-452c determined by the CNN module 150 (e.g., a body size, body proportions, etc.). The processors 106a-106n may be configured to determine a location of the seats 502a-502b and/or the bench seat 252a. The processors 106a-106n may be configured to determine the location of the occupants 452a-452c within the cabin of the vehicle 50. In one example, 3D co-ordinates of the body of the occupants 452a-452c may be determined (e.g., by determining a horizontal co-ordinate, a vertical co-ordinate and/or a depth co-ordinate for each occupant 452a-452n with respect to the lens 112a of the capture device 102a). In another example, various objects within the vehicle 50 may be used to provide a location of the occupants 452a-452c (e.g., a location of the seats 502a-502b and/or the bench 252a, a location of the steering wheel 552, distance from the windows and/or side panels, etc.). In yet another example, the sensor fusion module 152 may be configured to analyze input from the vehicle sensors 114 to perform sensor fusion operations (e.g., cross-reference a location determined based on the computer vision operations with weight sensors located in the seats 502a-502b and/or the bench 252a, perform a comparison based on LIDAR, perform a comparison based on radar detection, etc.). In still another example, the locations of various objects may be determined based on 3D positioning using a stereo pair of cameras (e.g., the video frame 550 may be one of a stereo pair of video frames captured by two of the capture devices 102a-102n). Locations may be further determined based on a monocular view (e.g., a monocular view may not provide an accurate result, but a high accuracy might not be necessary since the occupants 452a-452c may only need to be associated with the seats 502a-502b and/or the bench seat 252a). Based on the characteristics of the occupants 452a-452c, the locations of the seats 502a-502b and/or the bench 252a and the seats that the occupants 452a-452c are sitting in, the processors 106a-106n may determine whether to engage or disengage the child safety locks 420a-420n.

Vehicle doors 408a-408n are shown in the interior of the vehicle 50. The door 408a may be the driver side door. The door 408b may be the passenger side door. The door 408i may be the rear passenger door. The door 408n may be the rear driver door. Based on the location of the seats in the ego vehicle 50, the seats 502a-502b and/or the bench 252a may be associated with one or more of the doors 408a-408n. In the example shown, the door 408a may be associated with the seat 502a, the door 408b may be associated with the seat 502b, the door 408i and the door 408n may be associated with the bench seat 252a. The processors 106a-106n may associate the doors 408a-408n with the seats 502a-502b and/or the bench seat 252a to determine which of the doors 408a-408n to engage or disengage the child safety locks 420a-420n for based on where the occupants 452a-452n are seated.

The child safety lock 420b and the corresponding child lock control unit 422b are shown implemented in the door 408b. Each of the doors 408a-408n may have corresponding child safety locks 420a-420n and/or child lock control units 422a-422n (not all shown). In some embodiments, the driver side door 408a may not implement a child safety lock 420a or a child lock control unit 422a (e.g., since a child would not be driving). Each of the child safety locks 420a-420n may be configured to engage and/or disengage for the corresponding one of the doors 408a-408n. Each of the child lock control units 422a-422n may be configured to control engaging and/or disengaging of the corresponding child safety locks 420a-420n in response to the signal VCTRL' generated by the processors 106a-106n.

A block (or circuit) 560 is shown on the driver side door 408a. The block 560 may be a master control for the child safety locks 420a-420n. The master control 560 may be a mechanical switch and/or a touchscreen interface. In some embodiments, the master control 560 may be implemented as part of an infotainment system of the ego vehicle 50 (e.g., implemented on a front control panel instead of on the door 408a as shown). The master control 560 may enable the driver 452a to control the child safety locks 420a-420n. In one example, the master control 560 may provide input to enable the driver 452a to individually adjust the child safety locks 420a-420n. In another example, the master control 560 may provide input to enable the driver 452a to select the default operation of the child safety locks 420a-420n (e.g., always engaged, engaged but adjustable in response to the computer vision results by the processors 106a-106n, disengaged but adjustable in response to the computer vision results by the processors 106a-106n, always disengaged, etc.). In some embodiments, the master control 560 may be configured to override the selection for the child safety locks 420a-420n by the processors 106a-106n. In some embodiments, the selection for the child safety locks 420a-420n by the processors 106a-106n may override the selection by the driver 452a.

In the example video frame 550, the occupant 452a may be an adult driver. The computer vision operations may determine that the face 510a has characteristics corresponding to an adult male (e.g., adult facial features). The computer vision operations may further determine that the body of the occupant 452a is the body of an adult male (e.g., the body is tall relative to the seat 502a, the head 510a reaches the headrest of the seat 502a, the arms are not reaching up to touch the steering wheel 552, the size of the head 510a is small in proportion to the body, etc.). The processors 106a-106n may perform the computer vision operations to detect the location of the seat 502a (e.g., detect the driver seat in the front row 252c). In some embodiments, the locations of the seats 502a-502n may be pre-defined information stored in the memory 108 (e.g., based on location co-ordinates relative to the location of the capture device 102a). The processor 106a-106n may compare the determined characteristics of the occupant 452a with the threshold for the driver seat 502a (e.g., a person over the age of 16). In some embodiments, the detection of the driver 452a may not be performed for the purposes of controlling the child safety locks 420a-420n (e.g., the door 408a may not have the child safety lock 420a since the driver 452a would be over the age of 16). However, the camera system 100 may implement various other operations in response to computer vision and the processors 106a-106n may be capable of determining the age and/or other characteristics of the driver 452a for the other operations.

In the example video frame 550, the occupant 452b may be a child passenger. The computer vision operations may determine that the face 510b has characteristics corresponding to a child (e.g., pre-teen facial features). The computer vision operations may further determine that the body of the occupant 452b is the body of a young male below the age of 12 (e.g., the body is small relative to the seat 502b, the head 510b does not reach the headrest of the seat 502b, the size of the head 510b is large in proportion to the body, etc.). The processors 106a-106n may perform the computer vision operations to detect the location of the seat 502b (e.g., detect the passenger seat in the front row 252c). The processor 106a-106n may compare the determined characteristics of the occupant 452b with the threshold status for the child safety locks 420a-420n (e.g., a person over the age of 12, whether the person is recognized as a particular person, etc.). Since the passenger 452b is child (e.g., under the age of 12), the passenger 452b may not meet the criteria of the threshold for disengaging the child safety lock 420b.

In the example shown, the child safety lock 420b for the passenger side door 408b may be set to be disengaged by default (e.g., usually an adult sits in the front passenger seat 502b). The processors 106a-106n may detect the presence of the occupant 452b and that the location of the occupant 452b is in the front passenger seat 502b. The front passenger seat 502b may be associated with the passenger door 408b (e.g., due to the proximity of the seat 502b to the door 408b and/or due to the door 408b being within reach from the seat 502b). The processors 106a-106n may detect the face 510b of the occupant 452b and determine the age of the occupant 452b

(e.g., based on the facial characteristics and/or other characteristics of the body of the occupant 452*b*). The processors 106*a*-106*n* may check the determined age of the occupant 452*b* against the information in the memory 108 (e.g., the default settings for the child safety lock 420*b* and/or the threshold age for child safety lock 420*b*). Since the child is under the age of 12 (e.g., below the threshold age for the child safety lock 420*b*), the processors 106*a*-106*n* may generate the signal VCTRL'. In response to the signal VCTRL', the child lock control unit 422*b* may engage the child safety lock 420*b*.

In the example video frame 550, the occupant 452*c* may be a toddler. The computer vision operations may determine that the face 510*c* has characteristics corresponding to a toddler and/or a baby (e.g., very young facial features). The computer vision operations may further determine that the body of the occupant 452*c* is the body of an infant male below the age of 6 (e.g., the body is small relative to the seat 252*a*, the size of the head 510*c* is very large in proportion to the body, the feet of the occupant 452*c* do not reach the floor, etc.). The processors 106*a*-106*n* may perform the computer vision operations to detect the location of the seat 252*a* (e.g., detect the seat as a bench for the back row 252*a*). The processors 106*a*-106*n* may compare the determined characteristics of the occupant 452*c* with the threshold for child safety locks 420*i* and 420*n* (e.g., a person over the age of 12).

Since the passenger 452*c* is an infant (e.g., under the age of 12), the passenger 452*c* may not meet the criteria of the threshold for disengaging the child safety locks 420*i* and 420*n*. Since the occupant 452*c* is on the back bench seat 252*a*, both the doors 408*i* and 408*n* may be accessible to the occupant 452*c* (e.g., a person could move along the bench 252*a* to reach either the door 408*i* or the door 408*n*). The processors 106*a*-106*n* may associate the corresponding child safety locks 420*i* and 420*n* with the occupant 452*c*. The processors 106*a*-106*n* may generate the signal VCTRL' to cause the child lock control units 422*i* and 422*n* to engage the child safety locks 420*i* and 420*n* for the doors 408*i* and 408*n*.

The computer vision operations may detect the child safety seat 554. For example, for a child under the age of 6, there may be an exception when the child safety seat 554 is detected. Various criteria for the child safety seat 554 may be checked (e.g., size, orientation, whether the restraints are connected, etc.). If the occupant 452*c* is determined to be properly restrained in the child safety seat 554 then the doors 408*i* and 408*n* (e.g., the door handles 406*i* and 406*n*) may not be accessible by the occupant 452*c*. If the child 452*c* cannot access the door handles 406*i* and 406*n* because the child 452*c* is properly restrained in the child safety seat 554, then there may be no need to engage the child safety locks 420*i* and 420*n*.

The processors 106*a*-106*n* may be configured to determine the approximate age of the occupants 452*a*-452*n* and/or an associated confidence level indicating the determination of the age. The confidence level may represent a likelihood that the age determined is correct. In some scenarios, the age of the occupants 452*a*-452*c* may be difficult to determine and/or the age of the occupants 452*a*-452*c* may be close to the threshold for adjusting the child safety locks 420*a*-420*n*. For example, the child 452*b* may appear to be approximately 12 years old (e.g., right at the threshold age). In another example, the child 452*b* may be 14 years old but have a younger appearance. In still another example, the child 452*b* may be 11 years old but appear older than 12. In some embodiments, when the age is difficult to determine with respect to the threshold age, the processors 106*a*-106*n* may set the child safety locks 420*a*-420*n* according to the default settings stored in the memory 108. In some embodiments, when the age is difficult to determine with respect to the threshold age, the processors 106*a*-106*n* may prefer engaging the child safety locks 420*a*-420*n*.

In some embodiments, the child lock control units 422*a*-422*n* may not be implemented. For example, if the child 452*b* is determined to be under 12 years old, the processors 106*a*-106*n* may be configured to provide a prompt on an infotainment system touchscreen display and/or provide an audio message that tells the driver 452*a* that the passenger 452*b* is 12 years old or younger and the child safety lock 420*b* should be engaged. The driver 452*a* would then be able to decide whether to use the master controls 560 to engage the child safety lock 420*b*. In some embodiments, when the processors 106*a*-106*n* cannot confidently determine the age of the occupants 452*b*-452*c*, the processors 106*a*-106*n* may generate a message (e.g., audio using the vehicle speakers or video using the touchscreen display) asking if the occupants 452*b*-452*c* are below the threshold age. One of the occupants 452*a*-452*c* may respond to the prompt and the processors 106*a*-106*n* may engage or disengage the child safety locks 420*a*-420*n* based on the response to the prompt. For example, if one of the occupants 452*a*-452*c* confirms that the age of the occupant 452*b* is younger than 12 years old, then the processors 106*a*-106*n* may provide the signal VCTRL' to cause the child lock control unit 422*b* to engage the child safety lock 420*b*.

In the example shown, both the occupant 452*b* and the occupant 452*c* may be determined by the processors 106*a*-106*n* to be young children. Since the status of the occupants 452*b*-452*c* are both a young child, the processors 106*a*-106*n* may determine that all of the child safety locks 420*a*-420*n* should be engaged.

Figure 10:
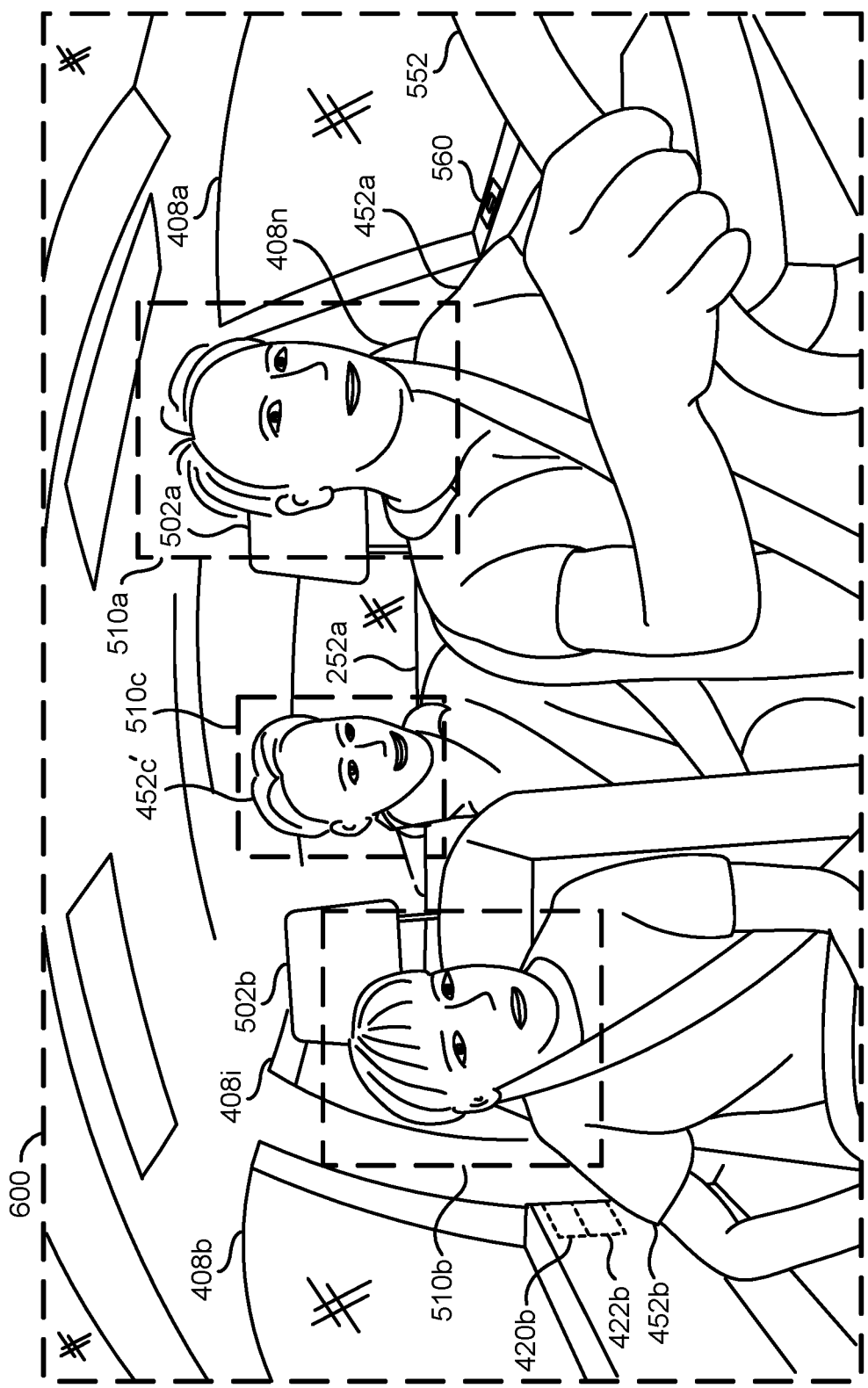
FIG. 10 is a diagram illustrating another example of a processor analyzing characteristics of passengers in a vehicle cabin.

Referring to FIG. 10, a diagram illustrating the processors 106*a*-106*n* analyzing characteristics of passengers in a video frame of a vehicle cabin is shown. The example video frame 600 may show the interior of the vehicle 50 having a similar view as the example video frame 550 shown in association with FIG. 9. The doors 408*a*-408*n*, the child safety lock 420*b*, the child lock control unit 422*b*, the steering wheel 552 and the master control 560 are shown. The occupants 452*a*-452*b* are shown in the seats 502*a*-502*b*. An occupant 452*c'* is shown sitting on the rear bench 252*a*. The dotted boxes 510*a*-510*c* are shown representing the processors 106*a*-106*n* detecting and analyzing the faces of the occupants 452*a*-452*b* and the occupant 451*c'*.

In the example shown, the occupant 452*c'* may be an adult. For example, if the threshold age for the child safety locks 420*a*-420*n* is 12 years old, the processors 106*a*-106*n* may determine that the occupant 452*c'* is older than 12 years old. Since the status of the occupant 452*c'* may be considered not vulnerable, the processors 106*a*-106*n* may disengage the child safety locks 420*i* and 420*n*. Since the occupant 452*c'* is sitting on the rear bench 252*a*, both the doors 408*i* and 408*n* may be accessible and associated with the occupant 452*c'*.

In the example shown, only one occupant (e.g., the occupant 452*c'*) is shown on the rear bench 252*a*. For the rear bench 252*a*, the processors 106*a*-106*n* may consider both the doors 408*i* and 408*n* to be associated with the occupant 452*c'*. If the rear bench 252*a* had more than one occupant, then the processors 106*a*-106*n* may decide that either both doors may be accessible by more than one occupant or each occupant may only be able to access one of the doors 408i or 408n.

In some embodiments, the processors 106a-106n may adjust the child safety locks 420i and 420n based on the age of the occupant that is closest to each door. In an example, if the adult occupant 452c' is sitting next to the door 408i and a child occupant is sitting next to the door 408n, then the processors 106a-106n may disengage the child safety lock 420i for the door 408i based on the closest presence of the adult occupant 452c' and engage the child safety lock 420n for the door 420n based on the closest presence of the child occupant.

In some embodiments, the processors 106a-106n may adjust the child safety locks 420i and 420n based on the age of the youngest occupant on the rear bench 252a. In an example, if the adult occupant 452c' is sitting next to the door 408i and a child occupant is sitting next to the door 408n, then the processors 106a-106n may engage both the child safety locks 420i and 420n. The presence of the adult occupant 452c' may be disregarded because of the potential that the child occupant could access either of the doors 408i and 408n.

In some embodiments, the apparatus 100 may implement multiple camera angles in order to aggregate video data to make the determination of the status of the occupants 452a-452n. In one example, one camera (e.g., one of the capture devices 102a-102n) may provide a wide angle view of the interior (e.g., as shown in the example video frame 600) and another camera may provide a directed view of one of the occupants (e.g., as shown in association with FIG. 8). Capturing video frames from multiple angles may provide a richer data set for the computer vision operations. The processors 106a-106n may be configured to combine the information from the various angles to increase and/or decrease a confidence level about various objects that have been detected. In one example, a profile view of one of the occupants (e.g., an occupant 452i) may be obscured by a hand of the occupant 452i, which may make a determination of age difficult. However, a front view may provide video data that may be used to determine age. The number of camera angles captured may be varied according to the design criteria of a particular implementation.

Figure 11:
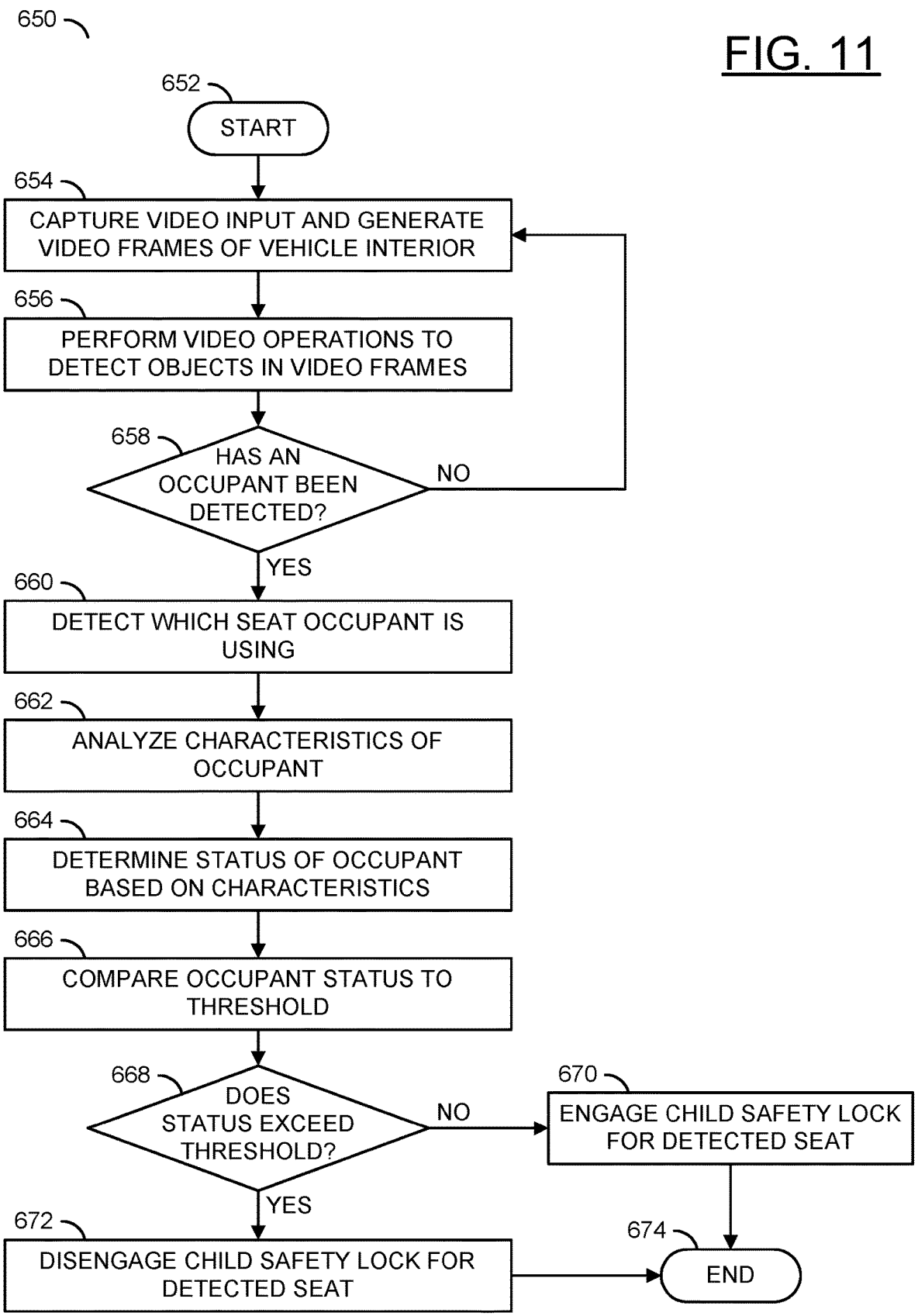
FIG. 11 is a flow diagram illustrating a method for implementing an intelligently controlled child safety lock.

Referring to FIG. 11, a method (or process) 650 is shown. The method 650 may implement an intelligently controlled child safety lock. The method 650 generally comprises a step (or state) 652, a step (or state) 654, a step (or state) 656, a decision step (or state) 658, a step (or state) 660, a step (or state) 662, a step (or state) 664, a step (or state) 666, a decision step (or state) 668, a step (or state) 670, a step (or state) 672, and a step (or The step 652 may start the method 650. Next, in the step 654, one or more of the capture devices 102a-102n may capture and/or generate the video frames FRAMES_A-FRAMES_N of the interior of the ego vehicle 50. In the step 656, the CNN module 150 may perform the video operations to detect objects (e.g., the occupants 452a-452n, the seats 502a-502n, the doors 408a-408n, etc.) in the video frames FRAMES_A-FRAMES_N. Next, the method 650 may move to the decision step 658.

In the decision step 658, the CNN module 150 may determine whether one of the occupants 452a-452n have been detected. For example, the CNN module 150 may compare the features of objects detected in the video frames FRAMES_A-FRAMES_N with features that correspond to a person. If no occupant has been detected, then the method 650 may return to the step 654. If an occupant has been detected, then the method 650 may move to the step 660. In the step 660, the decision module 158 may determine which seat the detected occupant is using. The seat 502a-502n that the detected occupant is located in may determine which of the child safety locks 420a-420n to control. For example, if the only occupant is the occupant 452a and the occupant 452a is detected in the driver seat 502a, then there may be no child safety lock to control. Next, the method 650 may move to the step 662.

In the step 662, the CNN module 150 may perform computer vision operations on the detected occupants 452a-452n to analyze the characteristics of each occupant. For example, the characteristics may comprise an age, a behavior and/or an identity of the detected occupants 452a-452n. Next, in the step 664, the decision module 158 may determine a status of the occupant based on the characteristics detected. In an example, the status of the occupant may be an age class (e.g., child, adult, teenager, etc.), an identity (e.g., whether the detected occupant is a particular person) a behavior (e.g., sitting normally, trying to escape, acting erratically, etc.). In the step 666, the decision module 158 may compare the status of the occupants 452b-452n to a threshold (e.g., an age limitation, a confidence level of detecting gestures that indicate erratic behavior, a confidence level of detecting gestures that indicate an attempt to escape, environmental variables that indicate a danger to the occupants, etc.). Next, the method 650 may move to the decision step 668.

In the decision step 668, the decision module 158 may determine whether the status detected exceeds the threshold. If the status does not exceed the threshold, then the method 650 may move to the step 670. In the step 670, the processors 106a-106n may generate the signal VCTRL in order to cause the corresponding one of the child lock control units 422a-422n (e.g., based on the seat 502a-502n that the occupant is located in) to engage the corresponding one of the child safety locks 420a-420n. Next, the method 650 may move to the step 674. In the decision step 668, if the status detected does exceed the threshold, then the method 650 may move to the step 672. In the step 672, the processors 106a-106n may generate the signal VCTRL in order to cause the corresponding one of the child lock control units 422a-422n to disengage the corresponding one of the child safety locks 420a-420n. Whether exceeding the threshold or not corresponds with engaging or disengaging the child safety locks 420a-420n may be varied according to the design criteria of a particular implementation. Next, the method 650 may move to the step 674. The step 674 may end the method 650.

Figure 12:
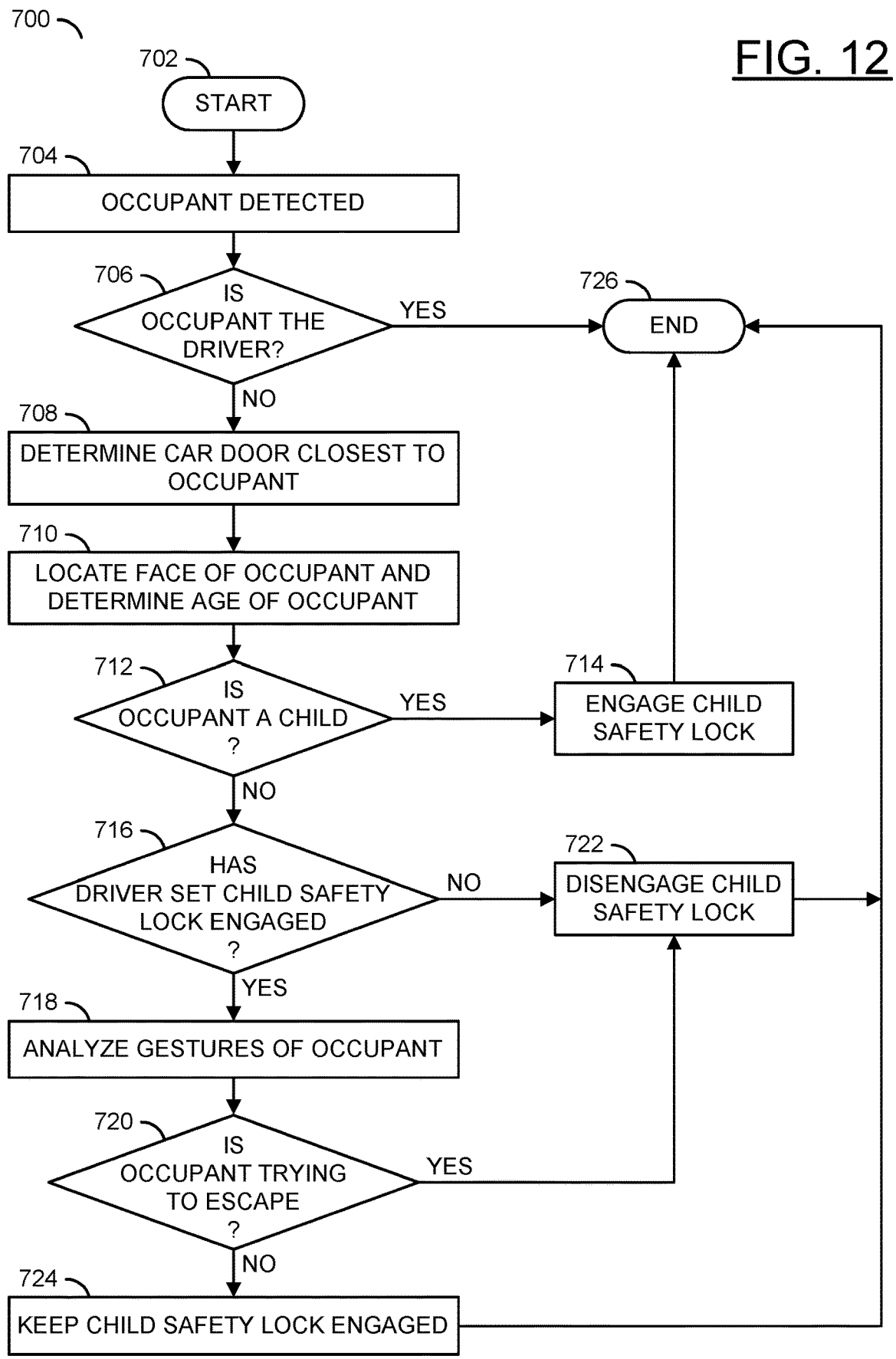
FIG. 12 is a flow diagram illustrating a method for controlling a child safety lock in response to an age of an occupant determined using computer vision.

Referring to FIG. 12, a method (or process) 700 is shown. The method 700 may control a child safety lock in response to an age of an occupant determined using computer vision. The method 700 generally comprises a step (or state) 702, a step (or state) 704, a decision step (or state) 706, a step (or state) 708, a step (or state) 710, a decision step (or state) 712, a step (or state) 714, a decision step (or state) 716, a step (or state) 718, a decision step (or state) 720, a step (or state) 722, a step (or state) 724, and a step (or state) 726.

The step 702 may start the method 700. In the step 704, the processors 106a-106n may determine that one or more of the occupants 452a-452n have been detected. Next, the method 700 may move to the decision step 706.

In the decision step 706, the processors 106a-106n may determine whether the occupant detected is the driver 452a. In an example, the CNN module 150 may determine the location of the steering wheel 552, which of the seats 502a-502n the steering wheel 552 is located in front of and then determine whether the detected occupant is in the particular one of the seats 502a-502n that has the steering wheel 552. If the occupant is the driver 452a, then the method 700 may move to the step 726. If the occupant is not the driver 452a, then the method 700 may move to the step 708.

In the step 708, the processors 106a-106n may determine which of the doors 408a-408n is closest (or accessible) to the detected occupant. Next, in the step 710, the processors 106a-106n may locate the face (e.g., one of the faces 510a-510n) of the detected occupant and determine the age of the occupant in response to performing the video operations to analyze the characteristics of the detected occupant. Next, the method 700 may move to the decision step 712.

In the decision step 712, the processors 106a-106n may determine whether the detected occupant is a child (e.g., below a threshold age such as 12 years old, in one example). If the occupant is a child, then the method 700 may move to the step 714. In the step 714, the processors 106a-106n may present the signal VCTRL to the particular one of the child lock control unit 422a-422n corresponding to the particular door 408a-408n (or multiple doors) that the detected occupant is closest to in order to engage the particular one of the child safety locks 420a-420n. Next, the method 700 may move to the step 726.

In the decision step 712, if the occupant is not a child, then the method 700 may move to the decision step 716. In the decision step 716, the processors 106a-106n may determine whether the driver 452a (or another user) has set the child safety locks 420a-420n to be engaged by default. For example, the driver 452a may set default settings for the child safety locks 420a-420n that may be stored in the memory 108. If the driver 452a has not set the child safety locks 420a-420n to a default engaged state, then the method 700 may move to the step 722. In the step 722, the processors 106a-106n may present the signal VCTRL to the particular one of the child lock control unit 422a-422n corresponding to the particular door 408a-408n (or multiple doors) that the detected occupant is closest to in order to disengage the particular one of the child safety locks 420a-420n. Next, the method 700 may move to the step 726.

In the decision step 716, if the driver has set the child safety locks 420a-420n to be engaged by default, then the method 700 may move to the step 718. In the step 718, the processors 106a-106n may analyze the gestures (or behavior) of the detected occupant by performing the video operations on the video frames FRAMES_A-FRAMES_N. Next, the method 700 may move to the decision step 720.

In the decision step 720, the processors 106a-106n may determine whether the occupant is trying to escape based on gestures, context and/or behavior. If the occupant is trying to escape, then the method 700 may move to the step 722. If the occupant is not trying to escape, then the method 700 may move to the step 724. In the step 724, the processors 106a-106n may keep the particular one of the child safety locks 420a-420n engaged. Next, the method 700 may move to the step 726. The step 726 may end the method 700.

The processors 106a-106n may be configured to detect gestures and/or actions of the passengers 452a-452n and/or interpret a context of the gestures and/or actions of the passengers 452a-452n. In an example, a gesture detected by the processors 106a-106n may comprise detecting an arm of the passenger 452b moving to the door handle 406b of the door 408b. In another example, a gesture detected by the processors 106a-106n may comprise detecting the hand of the passenger 452c pulling the door handle 406c of the door 408c. The types of gestures that may be detected by the processors 106a-106n may be varied according to the design criteria of a particular implementation.

The processors 106a-106n may be configured to detect the gesture and/or determine the context of the gesture (e.g., determine behavior) based on analyzing all of the video data in the video frame. In one example, if the passenger 452b is determined to be a child (e.g., the age characteristic is estimated to be 12 years old) then detecting the gesture of pulling the door handle 406b may be an indication that the child is playing with the door handle 406b (e.g., could accidentally open the door 408b). Based on the context (e.g., potential danger to the passenger 452b), the processors 106a-106n may determine that the child safety lock 420b should be engaged.

In another example, if the passenger 452b is determined to be an adult and multiple gestures of attempting to pull the door handle 406b are detected (e.g., a pattern), the context may be determined to be different. Multiple, repeated attempts to pull the door handle 406b may indicate that the passenger 452b is frantically trying to escape the ego vehicle 50. The processors 106a-106n may analyze other portions of the video frames to further understand the context. In an example, if fire is detected in the ego vehicle 50 and/or water filling the ego vehicle 50 is detected, the processors 106a-106n may determine that the passenger 452b is attempting to escape the ego vehicle 50 and the child safety lock 420b may be disengaged. In another example, if the driver 452a is determined to be acting aggressively (e.g., reaching for the passenger 452b and/or holding a weapon), the processors 106a-106n may determine that the passenger 452b may be under attack and trying to escape the ego vehicle 50 and the processors 106a-106n may determine that the child safety lock 420b should be disengaged to enable the passenger 452b to escape. For example, with ride-sharing apps many adults enter the vehicles of strangers, which can be a risky situation. The behavior of other of the occupants 452a-452n may be analyzed to determine whether the occupant 452b is attempting to escape the ego vehicle 50.

The processors 106a-106n may determine the context of the actions of the occupants 452a-452n and/or other environmental data (e.g., fire, analyzing the sensors 114 to determine if a car crash has occurred, etc.), to evaluate the potential risk of allowing the child safety locks 420a-420n to be engaged or disengaged. The processors 106a-106n may determine a confidence level of the particular behavior and/or context. For example, a child pulling the door handle 406b may have a low confidence level for an escaping danger context and a high confidence level for dangerous/reckless behavior. The confidence level may be increased by various factors and/or the context. In another example, the confidence level for detecting that the passenger 452b is attempting to escape danger may increase if the passenger 452b is an adult. In still another example, the confidence level that the passenger 452b is attempting to escape danger may increase if repeated attempts to open the door handle 406b are performed and/or signs of danger are detected (e.g., fire). In another example, if the passenger 452b is an adult and signs of drug use and/or mental incapacity are detected (e.g., confused behavior), then the signal VCTRL may be configured to engage the child safety lock 420b. The processors 106a-106n may generate the signal VCTRL in response to the evaluation of the risk based on the context and/or gestures detected and/or the confidence levels that the detected context and/or gestures have been determined accurately (e.g., the confidence level of detecting a particular behavior).

The processors 106a-106n may be configured to detect the identity of a person. For example, the database 174 may store feature markers of previously detected faces (e.g., a known face). The previously detected faces may be correlated with particular settings for the child safety locks 420a-420n. The processors 106a-106n may analyze the faces 510a-510n and extract the feature markers of the faces 510a-510n. The processors 106a-106n may compare the feature markers of the faces 510a-510n with the stored feature markers from the database 174.

Based on the comparison of the extracted feature markers with the stored feature markers, the processors 106a-106n may determine a confidence level of a match. In an example, the processors 106a-106n may determine a match confidence level of 100%, 75%, 50%, 0%, etc. The processors 106a-106n may implement a confidence level threshold for the match when determining whether to control the child safety locks 420a-420n. In one example, if the confidence level of the match is above 80%, the processors 106a-106n may implement the child safety lock status that corresponds with the stored matching face. In an example, one particular stored face in the database 174 may have a child safety lock setting of 'always lock'. When the processors 106a-106n have a 80% confidence level or above of the particular stored face, then the processors 106a-106n may generate the signal VCTRL (e.g., comprising an instruction to lock the child safety lock) for the particular one of the child lock control units 422a-422n associated with the seat that the particular passenger was detected in.

Figure 13:
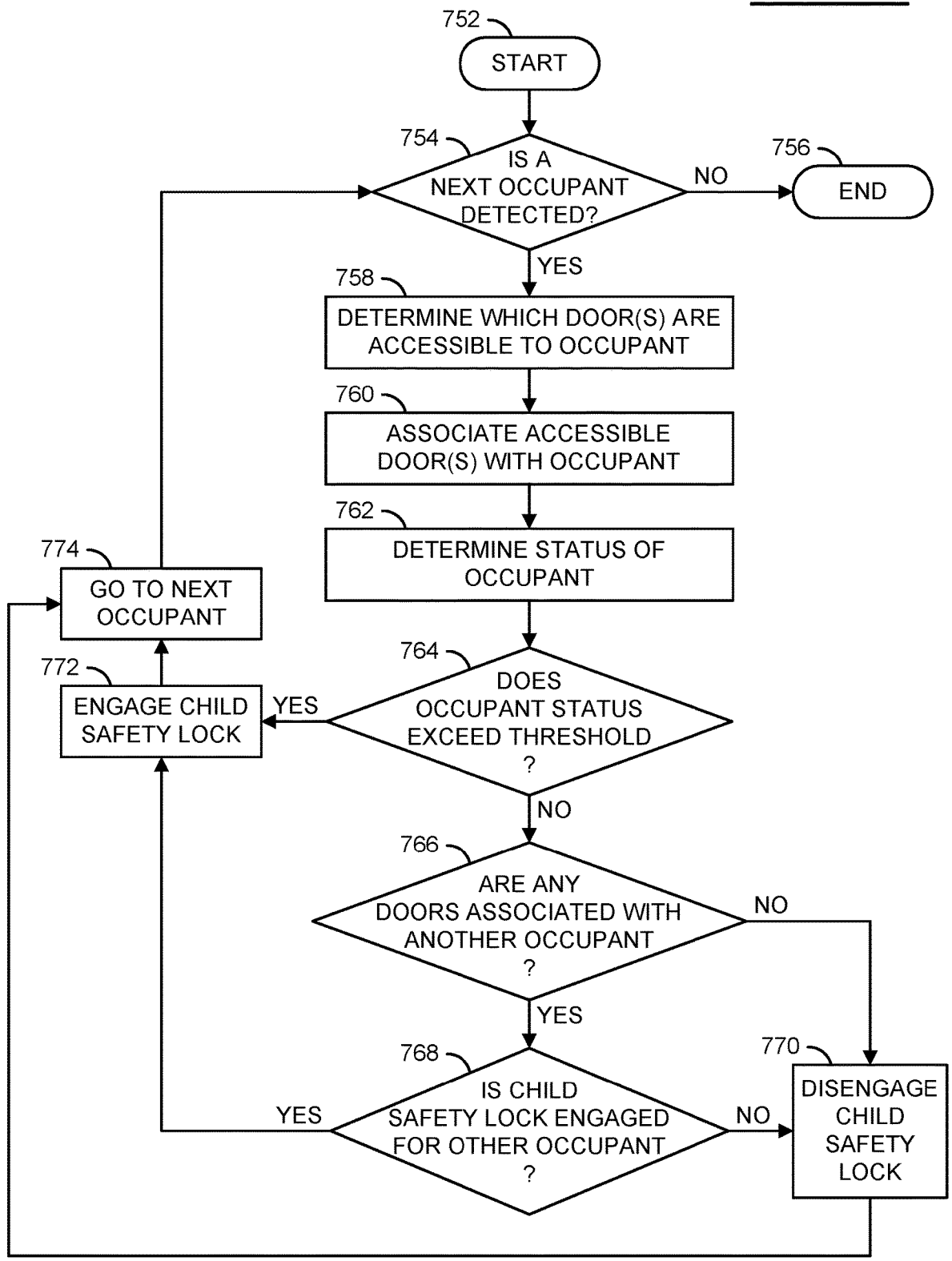
FIG. 13 is a flow diagram illustrating a method for intelligently controlling each child safety lock in a vehicle.

Referring to FIG. 13, a method (or process) 750 is shown. The method 750 may intelligently control each child safety lock in a vehicle. The method 750 generally comprises a step (or state) 752, a decision step (or state) 754, a step (or state) 756, a step (or state) 758, a step (or state) 760, a step (or state) 762, a decision step (or state) 764, a decision step (or state) 766, a decision step (or state) 768, a step (or state) 770, a step (or state) 772, and a step (or state) 774.

The step 752 may start the method 750. In the decision step 754, the processors 106a-106n may determine whether a next one of the occupants 452a-452n has been detected. If there are no more occupants detected, then the method 750 may move to the step 756. The step 756 may end the method 750. In the decision step 754, if there are more of the occupants 452a-452n, then the method 750 may move to the step 758.

In the step 758, the processors 106a-106n may determine which of the doors 408a-408n may be accessible to the current one of the occupants 452a-452n. For example, the doors 408a-408n that are closest, within reach, have no other objects in between, etc. may be considered to be accessible to the current one of the occupants 452a-452n. Next, in the step 760, the processors 106a-106n may associate the doors 408a-408n that are determined to be accessible to the current one of the occupants 452a-452n. In the step 762, the processors 106a-106n may perform the video operations to determine the status of the current one of the occupants 452a-452n. Next, the method 750 may move to the decision step 764.

In the decision step 764, the processors 106a-106n may determine whether the status of the current one of the occupants 452a-452n exceeds the threshold (e.g., an age limit, a behavior, and identification and/or other factors). If the status of the current one of the occupants 452a-452n does exceed the threshold, then the method 750 may move to the step 772. If not, then the method 750 may move to the decision step 766.

In the decision step 766, the processors 106a-106n may determine whether there are any of the doors 408a-408n associated with the current one of the occupants 452a-452n are also associated with another one of the occupants 452a-452n. If not, then the method 750 may move to the step 770. If there are one or more associated doors 408a-408n associated with another one of the occupants 452a-452n, then the method 750 may move to the decision step 768.

In the decision step 768, the processors 106a-106n may determine whether the child safety locks 420a-420n corresponding to the associated doors 408a-408n have been set to be engaged for another one of the occupants 452a-452n. If not, then the method 750 may move to the step 770. In the step 770, the processors 106a-106n may generate the signal VCTRL for the child lock control units 422a-422n that correspond to the doors 408a-408n associated with the current one of the occupants 452a-452n to disengage the corresponding child safety locks 420a-420n. Next, the method 750 may move to the step 774. In the decision step 768, if the child safety locks 420a-420n corresponding to the associated doors 408a-408n have been set to be engaged for another one of the occupants 452a-452n, then the method 750 may move to the step 772.

In the step 772, the processors 106a-106n may generate the signal VCTRL for the child lock control units 422a-422n that correspond to the doors 408a-408n associated with the current one of the occupants 452a-452n to engage the corresponding child safety locks 420a-420n. Next, the method 750 may move to the step 774. In the step 774, the processors 106a-106n may analyze a next one of the occupants 452a-452n. In the example flow diagram 750, each occupant 452a-452n is shown as being analyzed sequentially. However, the processors 106a-106n may be configured to analyze the occupants 452a-452n sequentially, in parallel, partially in parallel, etc.

Figure 14:
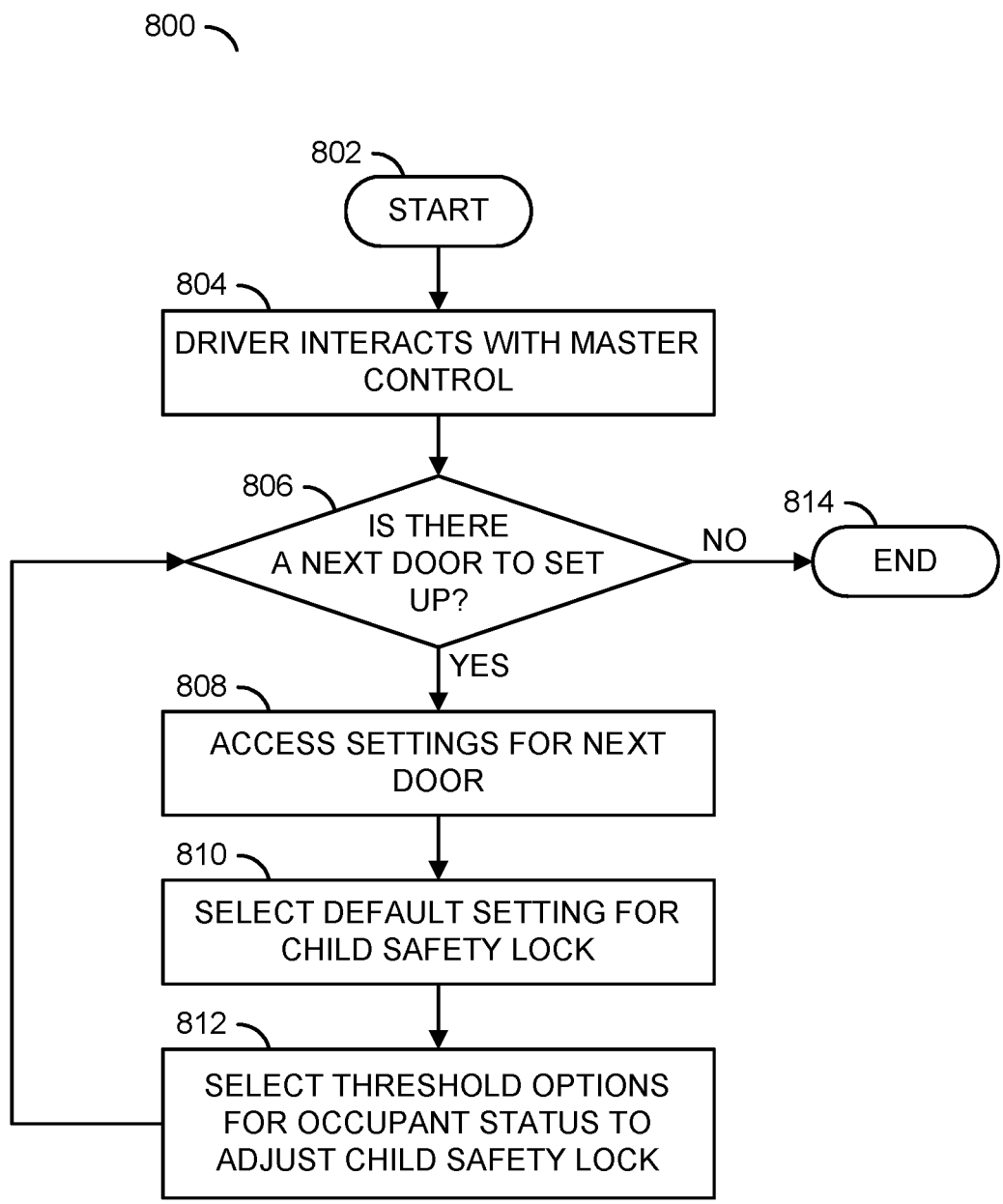
FIG. 14 is a flow diagram illustrating a method for initialization of a child safety lock control.

Referring to FIG. 14, a method (or process) 800 is shown. The method 800 may initialize a child safety lock control. The method 800 generally comprises a step (or state) 802, a step (or state) 804, a decision step (or state) 806, a step (or state) 808, a step (or state) 810, a step (or state) 812, and a step (or state) 814.

The step 802 may start the method 800. In the step 804, the driver 452a may interact with the master control 560. For example, interacting with the master control 560 may enable the driver 452a to set up default settings for the child safety locks 420a-420n. Next, the method 800 may move to the decision step 806.

In the decision step 806, the processors 106a-106n may determine whether there is a next one of the doors 408a-408n to set up. In some embodiments, the processors 106a-106n may be configured to receive input and/or provide output for the master control 560. In another example, the master control 560 may be controlled by a component of the ego vehicle 50. In the example described in the method 800, each door may be set up sequentially. However, the default settings for the doors 408a-408n may be set up sequentially, in parallel, partially in parallel, etc. If there is a next door to set up, then the method 800 may move to the step 808.

In the step 808, the processors 106a-106n may access the door settings for the next one of the doors 408a-408n. In an example, the settings for the doors 408a-408n may be stored in the database 174 of the memory 108. Next, in the step 810, the driver 452a may select default settings for one of the child safety lock 420a-420n that corresponds to the current one of the doors 408a-408n. The master control 560 may provide an interface to select the default settings. In an example, the driver 452a may select always lock, always unlock, lock by default and unlock based on a characteristic threshold and unlock by default and lock based on a characteristic threshold. In the step 812, the driver 452a may select threshold options for the occupant status in order to adjust the child safety locks 420a-420n. The master control 560 may provide an interface to select the threshold options. In an example, the threshold options may be an age limit (e.g., lock if occupant is determined to be younger than 14 years old). In another example, the threshold options may be an identity of an occupant (e.g., lock if a particular person is identified based on facial recognition performed by the processors 106a-106n). Next, the method 800 may return to the decision step 806.

In the decision step 806, if there are no more of the doors 408a-408n to set up, then the method 800 may move to the step 814. The step 814 may end the method 800.

The functions performed by the diagrams of FIGS. 1-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform. ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to receive pixel data corresponding to an interior view of a vehicle; and
a processor configured to (i) process said pixel data arranged as video frames, (ii) perform operations on said video frames to detect objects in said video frames, (iii) detect and determine a location of an occupant within said vehicle based on said objects detected in said video frames, (iv) detect a face of said occupant in said video frames, (v) analyze biometric markers of said face extracted from said video frames to determine an age of said occupant and (vi) generate a signal in response to a comparison of said age of said occupant to a threshold age limit, wherein (a) said signal is configured to control a door lock and (b) said door lock controlled by said signal corresponds to said location of said occupant.

2. The apparatus according to claim 1, wherein said door lock prevents said occupant from opening a door of said vehicle from inside said vehicle.

3. The apparatus according to claim 1, wherein said signal is configured to engage said door lock when said age of said occupant is below said threshold age limit.

4. The apparatus according to claim 1, wherein said signal is configured to disengage said door lock when said age of said occupant is above said threshold age limit.

5. The apparatus according to claim 1, wherein said threshold age limit corresponds to local rules for use of said door lock.

6. The apparatus according to claim 1, wherein (i) said age of said occupant is determined in response to matching said face of said occupant to a known face and (ii) said matching is determined based on a confidence level that facial features detected in said video frames for said face correspond to said known face.

7. The apparatus according to claim 1, wherein said processor is further configured to (a) determine a seat that said occupant is using based on said location, (b) associate a door of said vehicle with said seat and (c) adjust said door lock for said door based on said age.

8. The apparatus according to claim 1, wherein said door lock for each door of said vehicle operates according to one of a plurality of modes of operation that comprise (a) said door lock is always engaged, (b) said door lock is always disengaged, (c) said door lock is disengaged by default and engaged in response to said age of said occupant and said location of said occupant and (d) said door lock is engaged by default and disengaged in response to said age of said occupant and said location of said occupant.

9. The apparatus according to claim 1, further comprising a child lock control unit configured to engage or disengage said door lock in response to said signal, wherein said door lock is a child safety lock.

10. A method for controlling a door lock inside of a vehicle, comprising the steps of:
- receiving pixel data corresponding to an interior view of said vehicle;
- processing said pixel data arranged as video frames;
- performing operations on said video frames to detect objects in said video frames;
- detecting and determining a location of an occupant within said vehicle based on said objects detected in said video frames;
- detecting a face of said occupant in said video frames;
- analyzing biometric markers of said face extracted from said video frames to determine an age of said occupant; and
- generating a signal in response to a comparison of said age of said occupant to a threshold age limit, wherein (a) said signal is configured to control a door lock and (b) said door lock controlled by said signal corresponds to said location of said occupant.

11. An apparatus comprising:
- an interface configured to receive pixel data corresponding to an interior view of a vehicle; and
- a processor configured to (i) process said pixel data arranged as video frames, (ii) perform operations on said video frames to detect objects in said video frames, (iii) detect (a) an occupant of said vehicle and (b) a seat of said vehicle based on said objects detected in said video frames, (iv) analyze a behavior of said occupant over a sequence of said video frames, (v) determine a confidence level that said behavior matches a particular type of behavior by performing said operations on said occupant in said video frames and (vi) generate a signal in response to a comparison of said behavior of said occupant to said particular type of behavior, wherein (a) said signal is configured to control a door lock and (b) said door lock controlled by said signal corresponds to said seat used by said occupant.

12. The apparatus according to claim 11, wherein said signal is configured engage said door lock when said particular type of behavior matched to said behavior comprises an indication of mental incapacity.

13. The apparatus according to claim 11, wherein said signal is configured engage said door lock when said particular type of behavior matched to said behavior comprises an indication of drug use.

14. The apparatus according to claim 11, wherein said confidence level is determined in response to analyzing a context of said behavior.

15. The apparatus according to claim 14, wherein said context comprises a fire in said vehicle, water filling said vehicle and aggression against said occupant.

16. The apparatus according to claim 14, wherein said signal is configured to disengage said door lock when said context indicates a danger to said occupant and said occupant is attempting to escape said vehicle.

17. The apparatus according to claim 14, wherein said context is used to determine whether said occupant is attempting to escape said vehicle based on (a) a behavior of another occupant of said vehicle and (b) a detection of a collision of said vehicle.

18. The apparatus according to claim 11, wherein said door lock prevents said occupant from opening a door of said vehicle from inside said vehicle.

19. The apparatus according to claim 11, further comprising a child lock control unit configured to engage or disengage said door lock in response to said signal, wherein said door lock is a child safety lock.

* * * * *